US008862911B2

(12) United States Patent
Aoyagi

(10) Patent No.: US 8,862,911 B2
(45) Date of Patent: Oct. 14, 2014

(54) INFORMATION PROCESSING APPARATUS, METHOD FOR AVOIDING A TIME-OUT ERROR

(75) Inventor: Takeshi Aoyagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 13/463,419

(22) Filed: May 3, 2012

(65) Prior Publication Data
US 2012/0290855 A1    Nov. 15, 2012

(30) Foreign Application Priority Data

May 13, 2011    (JP) ................................. 2011-107821

(51) Int. Cl.
| G06F 1/00 | (2006.01) |
| G06F 11/00 | (2006.01) |
| H04N 1/00 | (2006.01) |
| G06F 1/32 | (2006.01) |
| G06F 11/07 | (2006.01) |
| G06F 1/26 | (2006.01) |
| H04N 1/32 | (2006.01) |

(52) U.S. Cl.
CPC .............. *G06F 1/26* (2013.01); *H04N 1/00952* (2013.01); *G06F 1/3287* (2013.01); *G06F 11/0757* (2013.01); *H04N 1/00891* (2013.01); *Y02B 60/1267* (2013.01); *G06F 1/3206* (2013.01); *G06F 11/0745* (2013.01); *H04N 2201/0094* (2013.01); *H04N 1/32625* (2013.01); *G06F 1/3284* (2013.01)

USPC .............................. 713/300; 713/324; 714/55

(58) Field of Classification Search
CPC ..................................................... G06F 1/3203
USPC .......................................................... 713/300
See application file for complete search history.

(56) References Cited

U.S. PATENT DOCUMENTS

| 5,325,521 | A | * | 6/1994 | Koyama et al. ................. 714/55 |
| 7,366,950 | B2 | * | 4/2008 | Itoh et al. ......................... 714/24 |
| 7,873,880 | B2 | * | 1/2011 | Arataki et al. ................... 714/55 |
| 8,055,924 | B2 | * | 11/2011 | Koizumi ......................... 713/324 |
| 8,578,181 | B2 | * | 11/2013 | Tanaka ........................... 713/300 |

FOREIGN PATENT DOCUMENTS

JP    2000-227893 A    8/2000

* cited by examiner

*Primary Examiner* — Suresh Suryawanshi
(74) *Attorney, Agent, or Firm* — Canon U.S.A., Inc. IP Division

(57) ABSTRACT

An information processing apparatus includes a processing unit, a power supply control unit configured to control powering on and off of the processing unit, and a controller unit configured to access the processing unit irrespective of a power supply state of the processing unit. The power supply control unit powers off a processing unit that is not in use, powers on a processing unit that is accessed by the controller unit, and outputs a predetermined control signal to the controller unit. The controller unit recognizes that an error occurs in a case where, after accessing a processing unit, the controller unit does not receive a response from the accessed processing unit until a time-out time elapses, and delays recognizing the error when the control signal is received.

13 Claims, 23 Drawing Sheets

FIG.4

| | |
|---|---|
| Module-A | 0x0000 ↓ 0x0FFF |
| Module-B | 0x1000 ↓ 0x1FFF |
| Module-C | 0x2000 ↓ 0x2FFF |
| POWER SUPPLY CONTROL UNIT | 0x3000 ↓ 0x3FFF |

STANDBY STATE:
S3 STATE/S-Stb STATE

INFORMATION PROCESSING APPARATUS, METHOD FOR AVOIDING A TIME-OUT ERROR

BACKGROUND OF THE INVENTION

1. Field of the Invention

The present invention relates to an information processing apparatus, a method for controlling the same, and a storage medium.

2. Description of the Related Art

At present, application specific integrated circuits (ASIC) used in various types of information processing apparatuses are capable of performing the control of powering off a module which is not in use, to suppress power consumption thereof as a technique for disconnecting a power supply in the ASIC.

Until recently, as discussed in Japanese Patent Application Laid-Open No. 2000-227893, a central processing unit (CPU) has performed access control with the ON and OFF states of the power supply of each module grasped based on access information of each module.

The CPU controlling the ON and OFF of power supplies of a plurality of modules in the ASIC and accessing a register or a static random access memory (SRAM) in consideration of the power supply status of each module requires a complicated software control, so that it is not easy to perform implementation.

There has been a mechanism in which the control of a power supply is performed on an operating system (OS) basis, such as Advanced Configuration and Power Interface (ACPI), to facilitate the implementation of a power control system and, in particular, the control of software.

The control of a power supply in the ACPI is a mechanism in which troublesome state transition procedures can be automatically executed based on simple commands. However, there are various kinds of standard operating procedures to be observed to automatically execute the state transition procedures.

For the hardware to be configured, all pieces of hardware need to be powered on in an operating state (S0 state) and all pieces of hardware need to be powered off in a standby state (S3 state).

If the operating state (S0 state) is shifted to the standby state (S3 state), a sequence (steps S101 to S105) illustrated in FIG. 13 is required. FIG. 13 illustrates the shift of ACPI control from the S0 state to the S3 state. As illustrated in FIG. 13, in step S102, if an instruction for shift from the S0 state (in step S101) to the S3 state is issued, then in step S103, all of states of the hardware (such as register setting and data in the SRAM) set before a power supply is turned off is stored in a recording device such as a nonvolatile memory or a hard disk drive. Thereafter, in step S104, all pieces of hardware are powered off. In step S105, the system is shifted to a power saving mode.

Similarly, if the standby state (S3 state) is shifted to the operating state (S0 state), a sequence (steps S201 to S205) illustrated in FIG. 14 is required. FIG. 14 illustrates the shift of the ACPI control from the S3 state to the S0 state. As illustrated in FIG. 14, in step S202, if an instruction for shift from the S3 state (in step S201) to the S0 state is issued, then in step S203, all devices for controlling the power supplies are powered on. Thereafter, in step S204, the stored state set before the power supplies are turned off is read from the recording device to be returned to the state set before the power supplies are turned off (in step S205).

The control of the power supply based on the ACPI needs to observe procedures related to the abovementioned hardware configuration and the shift of states illustrated in FIGS. 13 and 14.

The following describes a digital multifunction peripheral (hereinafter referred to as MFP) for performing scan, print, and copy. FIG. 15 is a block diagram illustrating an example of the entire configuration of a general MFP. As illustrated in FIG. 15, an MFP control unit 301 includes a central processing unit (CPU) 305, acting as a processor for controlling the entire system, and a data processing unit 309 for various types of image processing. The MFP control unit 301 is connected to a scanner unit 302 being an image input device, a printer unit 303 being an image output device, and a network interface 304 connected to an external network such as a local area network (LAN) or a wide area network (WAN), thereby controlling the input and output of image information and device information and the image rasterization of page description language (PDL) data.

A memory 306 is a system work memory for operating the CPU 305 and an image memory for temporarily storing image data. A hard disk drive (HDD) storage unit 307 stores system software and image data in a hard disk drive.

A user interface 308 includes a display for displaying the state of the MFP and image data, buttons, switches, and a numeric keypad, whereby the user performs various types of settings to use the MFP, and a touch panel also used as the display and buttons.

FIG. 16 illustrates an example of an internal configuration of the MFP control unit 301 illustrated in FIG. 15. The CPU 305 controls the entire system of the MFP, and performs the register setting of the data processing unit 309, various types of settings of a lookup table using the SRAM, and the input and output control of image data.

For example, if a copy operation is performed, the CPU 305 sets various types of image processing to the data processing unit 309 based on settings from the user interface 308. At the time of completing the setting, the scanner unit 302 starts, reads a document, performs analog to digital conversion, and supplies digital data to the MFP control unit 301 as scan data. The data processing unit 309 subjects the scan data to image processing according to various coefficients previously set by the CPU 305 to generate image data for print output. The image data for print output, which are output from the data processing unit 309 in the MFP control unit 301, are input to the printer unit 303 and are then printed on a previously prepared output sheet.

The network interface 304 inputs signals for requesting a printer to operate and confirming the current operation state of the MFP from an external apparatus, such as a PC, connected to the external network. If the printer is requested to operate, various settings at the time of printing and image data for print are input to the MFP control unit 301 via the network interface 304 from the external network. The CPU 305 in the MFP control unit 301 performs various settings of the data processing unit 309 according to the input setting and then inputs the input image data for print to the data processing unit 309. The data processing unit 309 performs image processing according to various coefficients set by the CPU 305 to generate image data for print output. The image data for print output, which are output from the data processing unit 309 in the MFP control unit 301, are input to the printer unit 303 and are then printed on a previously prepared output sheet.

A signal for confirming the current operation state of the MFP can be input to the MFP control unit 301 from the network interface 304. In this case, the CPU 305 in the MFP control unit 301 outputs the state of the MFP system to the external network. The state of the MFP system includes states where the printer is being operated, the printer or the scanner is adjusted, and the input of data is waited.

The following describes an operation in a case where the power supply of the MFP control unit 301 is controlled based on the ACPI to simplify the power supply control using software. In the power supply control based on the ACPI, the MFP system uses two states, the S0 and S3 states. FIGS. 17 to 19 illustrate states of the MFP control unit 301. The S0 state refers to a state that shows operation at full capacity, in which all pieces of hardware in the MFP control unit 301 are powered on as illustrated in FIG. 17. More specifically, in the S0 state, both of the CPU 305 and the data processing unit 309 are powered on to allow communication with a network and to allow setting and data transfer between the CPU 305 and the data processing unit 309.

The S3 state refers to a standby state in which all pieces of hardware are powered off as illustrated in FIG. 18. More specifically, in the S3 state, both of the CPU 305 and the data processing unit 309 are powered off not to allow communication with a network and not to allow setting and data transfer between the CPU 305 and the data processing unit 309.

FIG. 20 illustrates changes in state in a case where the power supply of the MFP control unit 301 is controlled with the S0 and S3 states based on the ACPI. In FIG. 20, the topmost state represents a data processing state in which image data are input from the scanner unit 302 or the external interface and the image processed by the data processing unit 309 via the CPU 305 is being output. In this state, the MFP control unit 301 is brought into the S0 state, and the CPU 305 and the data processing unit 309 are powered on to perform predetermined processing.

In FIG. 20, the second state refers to a standby state. Normally, if a state in which processing is not performed for a certain period of time continues after the abovementioned data processing is finished, the MFP control unit 301 is brought into the standby state. In this state, the MFP control unit 301 is brought into the S3 state, and the CPU 305 and the data processing unit 309 are powered off to save power consumption at the time when the MFP system is not operated.

At this point, if the MFP control unit 301 is brought into the S3 state according to the regulations of the ACPI, the state before turning off the power supplies needs to be stored in a recording medium, such as a hard disk, so that the MFP control unit 301 can return to the state immediately before turning off the power supplies if the MFP control unit 301 is brought into the S0 state. For this reason, all of the state of the CPU 305 and various settings in the data processing unit 309 are to be stored in the recording medium.

If any data are input via the network interface 304 during the standby state, the MFP control unit 301 is brought into the third state (the S0 state) in response to the input data. If the input from the external network at this point is a request for operating the printer, the MFP control unit 301 is brought into the lowermost state with the S0 state kept unchanged, and the CPU 305 continuously performs various settings to the data processing unit 309. After the CPU 305 finishes various settings to the data processing unit 309, the image data to be processed are input, and data processing is performed.

If a signal for confirming the operation status of the MFP system is input from the external network in the third state (the S0 state), the CPU 305 recognizes the status of the MFP system at that point and outputs the result to the external network. If the signal is input to confirm the operation status of the MFP system from the external network, the MFP control unit 301 returns again to the second state (the standby state) when the CPU 305 completes outputting the state of the MFP system.

Thus, if the signal is input to confirm the operation status of the MFP system from the external network, a response is completed only by a process in the CPU 305 and image data are not processed, so that the data processing unit 309 may be powered off. In the S0 state, however, all pieces of hardware need to be powered on according to the regulations of the ACPI, so that the data processing unit 309 also needs to be powered on, which is essentially not required. Also at the time of merely responding to the network, all pieces of hardware are powered on to significantly reduce the effect of power saving.

As described above, if the MFP control unit 301 returns from the S3 state to the S0 state, all of the state of the CPU 305 and various settings of the data processing unit 309 stored in the recording medium, such as a hard disk, need to be read after the power supplies are turned on. Therefore, it is time-consuming to respond to the network after the power supplies are turned on. If the setting of the data processing unit 309 and the process of the data processing unit 309 such as a conversion table are complicated, it takes huge amounts of time to respond to the network.

The following describes an operation for power supply control in the MFP control unit 301 desired to be performed to save power. The states to be used here include S-Full state, S-Stb state, and S-Net state. The S-Full state refers to a state that shows operation at full capacity, in which all pieces of hardware are powered on as illustrated in FIG. 17. More specifically, both of the CPU 305 and the data processing unit 309 are powered on to allow communication with the network and to allow setting and data transfer between the CPU 305 and the data processing unit 309.

The S-Stb state refers to a standby state in which all pieces of hardware are powered off as illustrated in FIG. 18. More specifically, both of the CPU 305 and the data processing unit 309 are powered off not to allow communication with the network and not to allow setting and data transfer between the CPU 305 and the data processing unit 309.

The S-Net state refers to a network-response state in which the CPU 305 is powered on but the data processing unit 309 is powered off as illustrated in FIG. 19. More specifically, communication with the network can be performed by the CPU 305, but image data are not processed.

FIG. 21 illustrates changes in state in a case where the power supply of the MFP control unit 301 is controlled with three states (such as the S-Full state, the S-Stb state, and the S-Net state) illustrated in FIGS. 17 to 19.

In FIG. 21, the topmost state represents a data processing state in which image data are input from the scanner unit 302 or the external interface, and the image processed by the data processing unit 309 via the CPU 305 is being output. In this state, the MFP control unit 301 is brought into the S-Full state, and the CPU 305 and the data processing unit 309 are powered on to perform predetermined processing.

In FIG. 21, the second state represents a standby state. Normally, if a state in which processing is not performed for a certain period of time continues after the abovementioned data processing is finished, the MFP control unit 301 is brought into the standby state. In this state, the MFP control unit 301 is brought into the S-Stb state, and the CPU 305 and the data processing unit 309 are powered off to save power consumption at the time when the MFP system is not operated.

If any data are input via the network during the standby state, the MFP control unit 301 is brought into the third state (the S-Net state). If the input from the external network is a request for operating the printer, the MFP control unit 301 is brought into the lowermost state (the S-Full state) and the CPU 305 performs various settings to the data processing unit 309 to continuously process the data input from the external interface. After the CPU 305 finishes various settings to the data processing unit 309, the image data to be processed are input, and data processing is performed.

If a signal for confirming the operation status of the MFP system is input from the external network in the third state (the S-Net state), the CPU 305 recognizes the status of the MFP system at that point with the S-Net state kept unchanged and outputs the result to the external network. The MFP control unit 301 returns again to the second standby state when the CPU 305 completes outputting the state of the MFP system.

Unlike the control according to the ACPI, handling can be made without powering on the data processing unit 309 which is essentially not required in the S-Net state. Also at the time of merely responding to the network, the effect of power saving can be obtained without all pieces of hardware being powered on.

Unlike the control according to the ACPI, as described above, if the MFP control unit 301 returns from the S-Stb state, various settings of the data processing unit 309 stored in the recording medium, such as a hard disk, does not need to be read after the power supplies are turned on. Therefore, it does not take much time to respond to the external network after the power supplies are turned on to allow power consumption to be further reduced.

The above power supply control is performed to provide the effect of power saving by powering on only the CPU 305 at the time of merely responding to the network. If the state of the MFP control unit 301 shifts to a sleep state or returns therefrom, there is no need for transferring the state of the data processing unit 309 to the recording device, so that the MFP control unit 301 can quickly return from the sleep state.

In developing the MFP system at present, software is desired to perform control based on the ACPI standards to facilitate control. In other words, there is a demand in which process is desired to be performed based on two states, the S0 and the S3 states.

When there is no need to reduce power consumption, there is a demand in which control by which the data processing unit 309 is not powered on, i.e., processing based on three states, the S-Full, the S-Stb, and the S-Net states, is desired to be performed, at the time of merely responding to the network, for example, to reduce power consumption.

Then, a power supply control method which makes the two desires compatible with each other is required. As measures for realizing a control method which makes the two desires compatible with each other, there may be a method in which a difference in the number of states is covered by the process of hardware, as described below. In other words, the CPU 305 in the MFP control unit 301 is taken as a target for the power supply control based on the ACPI as software, and a process without regard to the power supply of the data processing unit 309 is performed. In the power supply control method, the power supply control of the data processing unit 309 is performed by hardware.

The following describes a system operation in a case where the control in two states based on the ACPI as the above software is compatible with the control of three states for saving power as a hardware configuration, with reference to FIG. 22.

FIG. 22 illustrates changes in the state of the MFP control unit 301 in a case where a system operation is performed when the control in two states based on the ACPI is compatible with the control of three states for saving power as a hardware configuration.

In this configuration, the CPU 305 in the MFP control unit 301 is taken as a target for the power supply control based on the ACPI, and the power supply control of the data processing unit 309 is performed by hardware. In FIG. 22, the topmost state represents a data processing state in which image data are input from the scanner unit 302 or the external interface, and the image processed by the data processing unit 309 via the CPU 305 is being output. In this state, the CPU 305 in the MFP control unit 301 is brought into the S0 state, and the CPU 305 is powered on.

Also in this state, predetermined processing is performed with the data processing unit 309 powered on. The MFP control unit 301 is brought into the S-Full state. In this case, access from the CPU 305 is detected by the hardware and the data processing unit 309 is powered on.

In FIG. 22, the second state refers to a standby state. Normally, if a state in which processing is not performed for a certain period of time continues after the abovementioned data processing is finished, the MFP control unit 301 is brought into the standby state. In this state, the CPU 305 and the data processing unit 309 are powered off, so that the MFP control unit 301 is brought into the S-Stb state, saving power consumption at the time when the MFP system is not operated.

If any signal is input via the network interface 304 during the standby state, the MFP control unit 301 is brought into the third state, i.e., a network response state. At this point, the CPU 305 is brought into the S0 state. The CPU 305 is powered on. The data processing unit 309 is kept powered off. The MFP control unit 301 is brought into the S-Net state.

If the input from the external network at this point is a request for operating the printer, the CPU 305 accesses the data processing unit 309 for register setting. The data processing unit 309 detects the access by hardware to turn on the power supply thereof, bringing the MFP control unit 301 into the lowermost state (the data processing state).

In this state, the CPU 305 in the MFP control unit 301 is brought into the S0 state and the CPU 305 is powered on. The data processing unit 309 is also powered on to perform predetermined processing. Therefore, the MFP control unit 301 is brought into the S-Full state. After that, the CPU 305 performs various settings to the data processing unit 309. Continuously, the image data to be processed are input and data processing is performed.

If a signal for confirming the operation status of the MFP system is input from the external network in the third S-Net state, the CPU 305 recognizes the status of the MFP system at that point with the S-Net state kept unchanged and outputs the result to the external network. Thus, if the signal for confirming the operation status of the MFP system is input from the external network, the MFP control unit 301 returns again to the second standby state when the CPU 305 completes outputting the state of the MFP system.

As described above, the system control of the three states capable of obtaining the effect of power saving is enabled by taking the CPU 305 in the MFP control unit 301 as a target for the power supply control based on the ACPI and performing the power supply control of the data processing unit 309 by hardware while performing the control based on the ACPI by software.

The following problem is caused if the system operation is performed in a case where the control in the two states based on the ACPI as software is compatible with the control in the three states for saving power as the MFP control unit 301.

When the network response state is shifted to the data processing state, the data processing module in the data processing unit 309 is kept powered off. If the CPU 305 accesses the data processing module in the data processing unit 309, the data processing unit 309 detects the access from the CPU 305 to power on the data processing module corresponding to the access. Even if the CPU 305 accesses the register while the power supply of the data processing module is being boosted on, the data processing unit 309 sends no response to the CPU 305 until the power supply of the data processing module is completely boosted.

For the ASIC with a circuit scale of a million gates in 90-nm process, for example, about 28 μsec are consumed before the power supply is completely boosted. For this reason, the CPU 305 recognizes such time consumption as time-out error. The time-out error is described below with reference to FIG. 23.

FIG. 23 illustrates the time-out error of the CPU 305. In the third network response state illustrated in FIG. 22, the CPU 305 is powered on, but the data processing unit 309 is powered off. A state immediately after the start of shift from the network response state to the data processing state is illustrated in FIG. 23. More specifically, the CPU 305 is powered on and the data processing unit 309 is being boosted although the data processing unit 309 is instructed to power off or on.

At this point, as described above, as for the software, control based on the ACPI is performed, which means that this state is processed in the S0 state, i.e., in recognition that all pieces of hardware are powered on. In shifting from the network response state to the data processing state, the CPU 305 recognizes that the power supply is turned on irrespective of the actual state of the power supply of the data processing unit 309 (i.e., the power supply is turned on or off) and executes access to the setting register or the SRAM in the data processing unit 309.

Actually, however, the data processing unit 309 is not completely booted, so that the CPU 305 cannot receive a response to the access to the data processing unit 309 in a predetermined time period of time-out error, which is recognized as the time-out error by the CPU 305. This causes a problem.

The data processing unit 309 needs to avoid the time-out error in controlling and boosting the power supply of the data processing module whose register and SRAM are accessed.

SUMMARY OF THE INVENTION

According to an aspect of the present invention, an information processing apparatus includes a processing unit, a power supply control unit configured to control powering on and off of the processing unit, and a controller unit configured to access the processing unit irrespective of a power supply state of the processing unit, wherein the power supply control unit is configured to power off a processing unit that is not in use, to power on the processing unit that is accessed by the controller unit, and to output a predetermined control signal to the controller unit, and wherein the controller unit is configured to recognize that an error occurs in a case where, after accessing a processing unit, the controller unit does not receive a response from the accessed processing unit until a time-out time elapses, and to delay recognizing the error when the control signal is received.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an address map of each module in the data processing unit.

DESCRIPTION OF THE EMBODIMENTS

Various exemplary embodiments, features, and aspects of the invention will be described in detail below with reference to the drawings.

Figure 1:
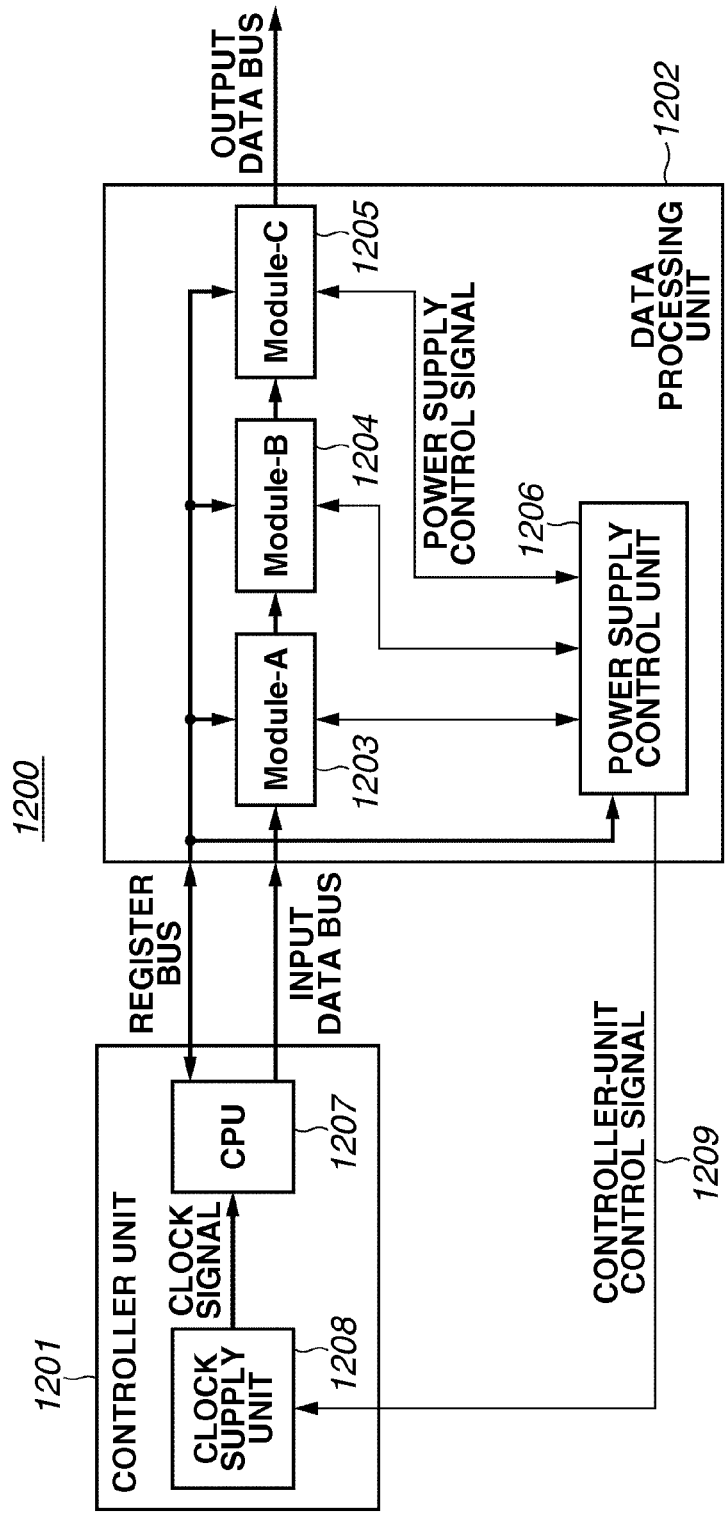
FIG. 1 illustrates an example of a configuration of a control unit (MFP control unit) of a multifunction peripheral (MFP) acting as an information processing apparatus according to a first exemplary embodiment of the present invention.

FIG. 1 is a block diagram illustrating an example of a configuration of a control unit (MFP control unit) of a multi-function peripheral (MFP) acting as an information processing apparatus according to a first exemplary embodiment of the present invention. Only portions related to the present invention are illustrated herein. The MFP excluding the MFP control unit is similar in configuration to the one that is illustrated in FIG. 15.

Figure 15:
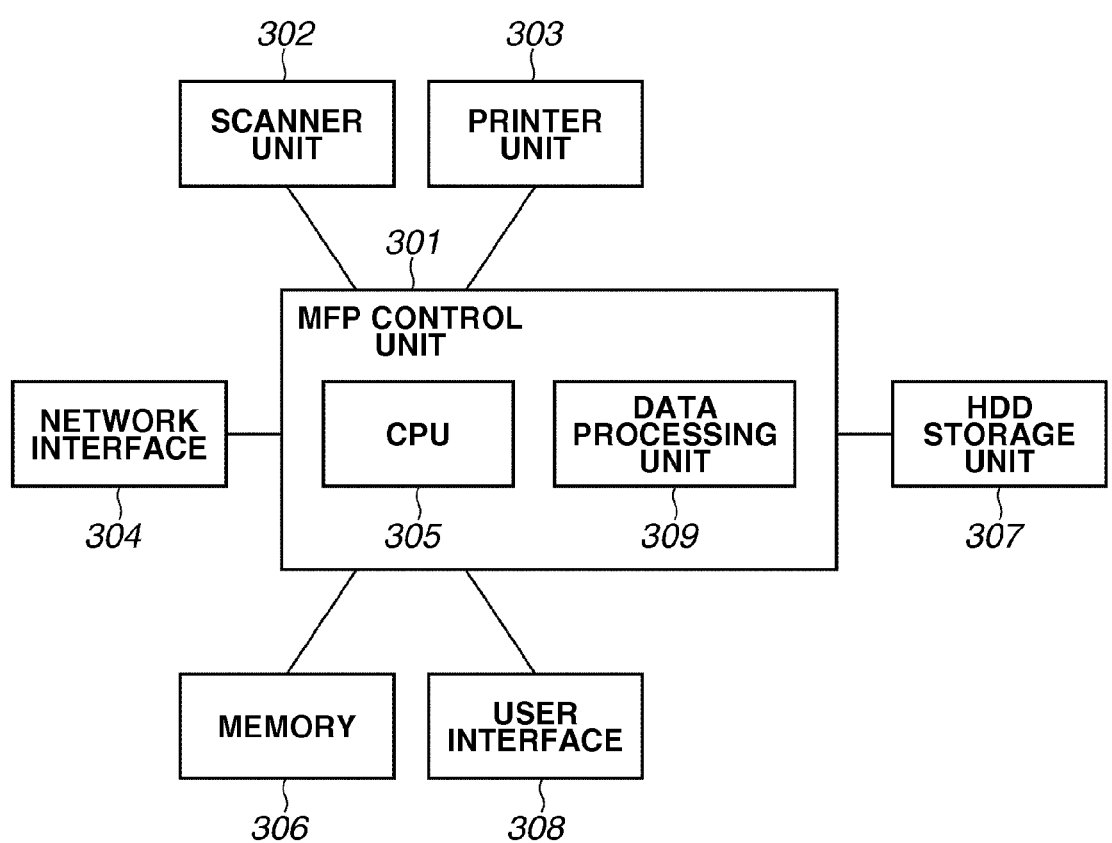
FIG. 15 is a block diagram illustrating an example of the entire configuration of a general MFP.
Figure 16:
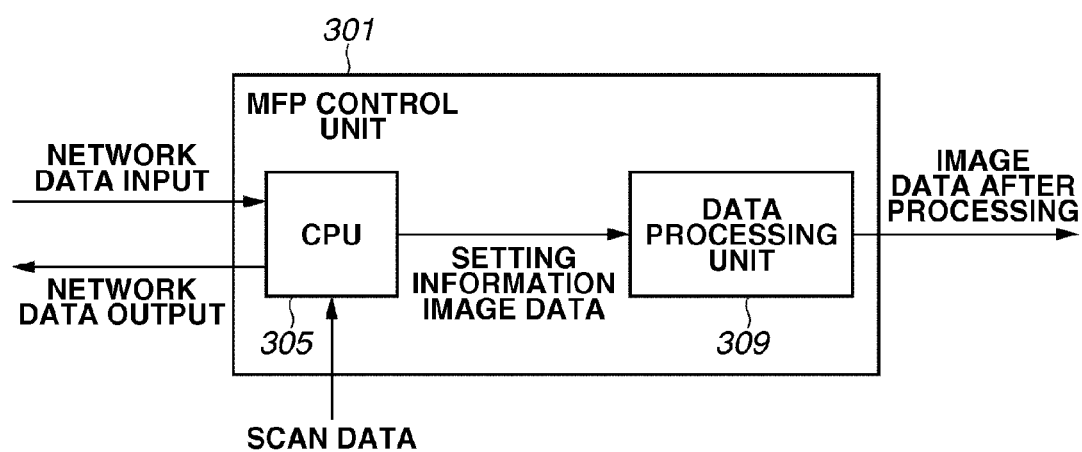
FIG. 16 illustrates an example of an internal configuration of the MFP control unit illustrated in FIG. 15.
Figure 17:
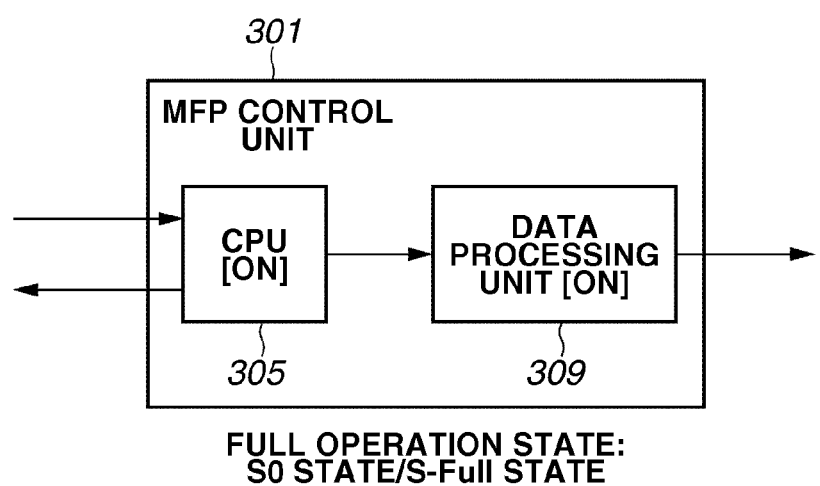
FIG. 17 illustrates the state of the MFP control unit.
Figure 18:
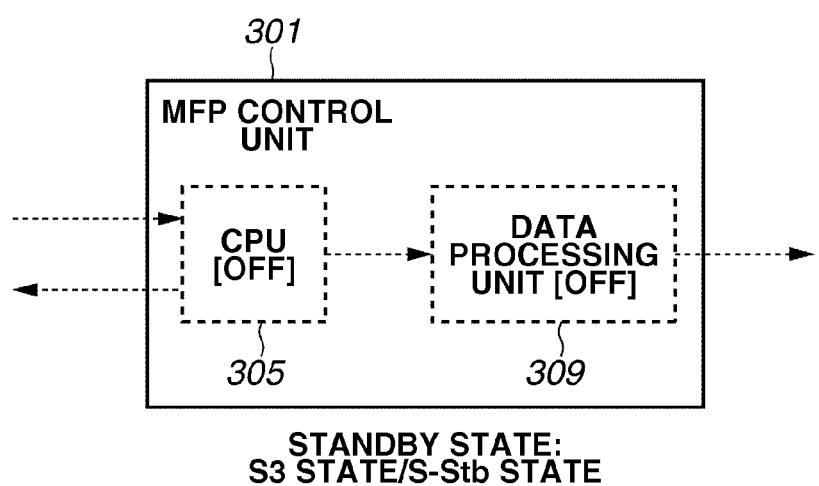
FIG. 18 illustrates the state of the MFP control unit.
Figure 19:
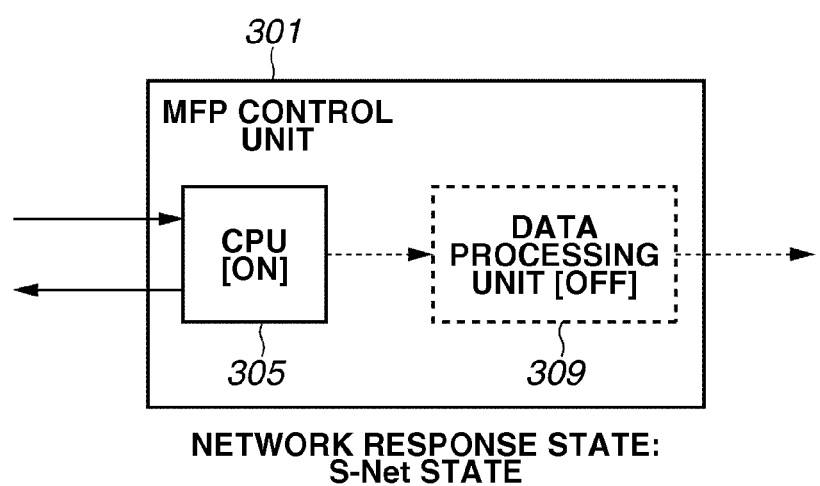
FIG. 19 illustrates the state of the MFP control unit.
Figure 20:
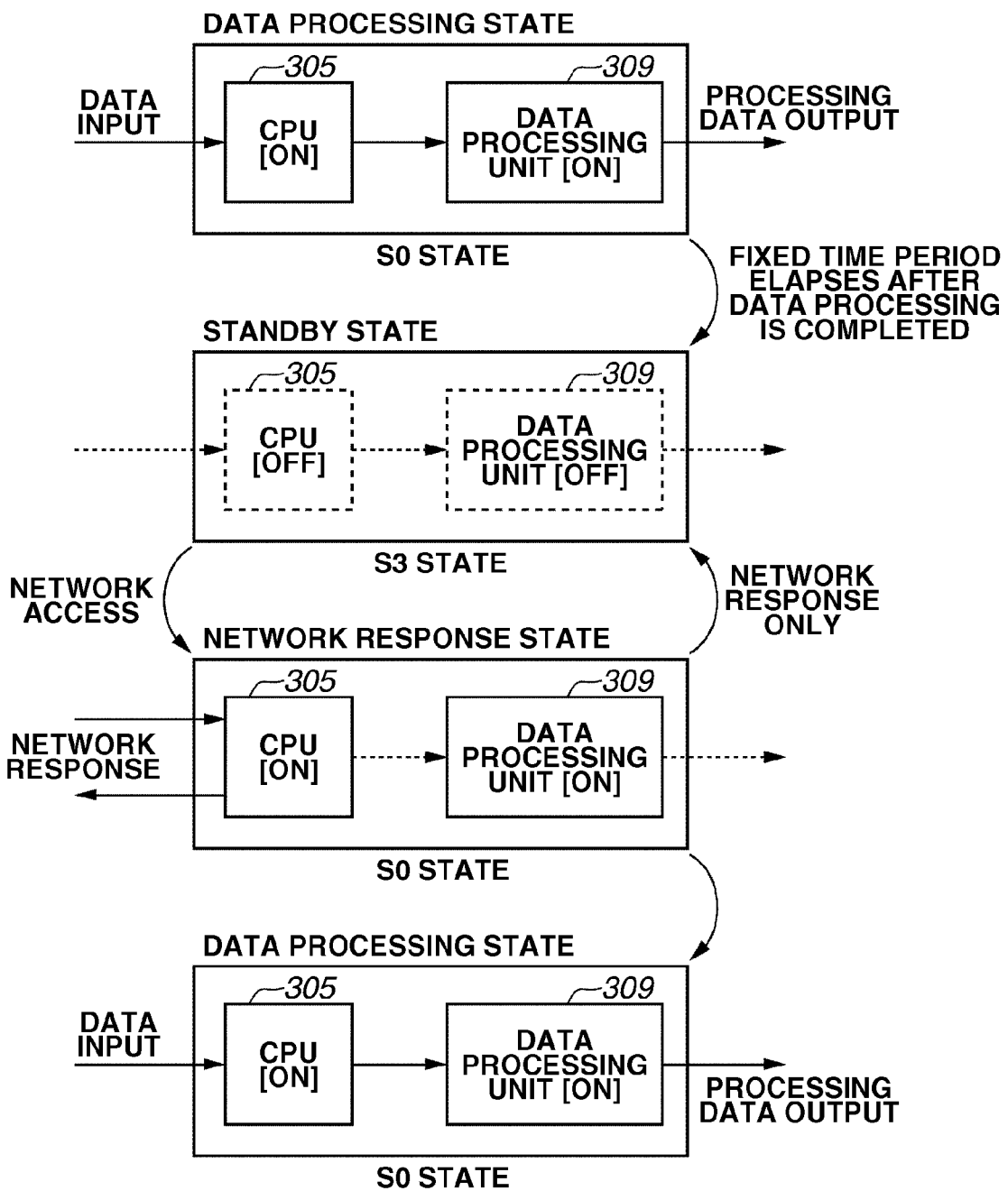
FIG. 20 illustrates changes in state in a case where the power supply of the MFP control unit is controlled with the S0 and S3 states based on the ACPI.
Figure 21:
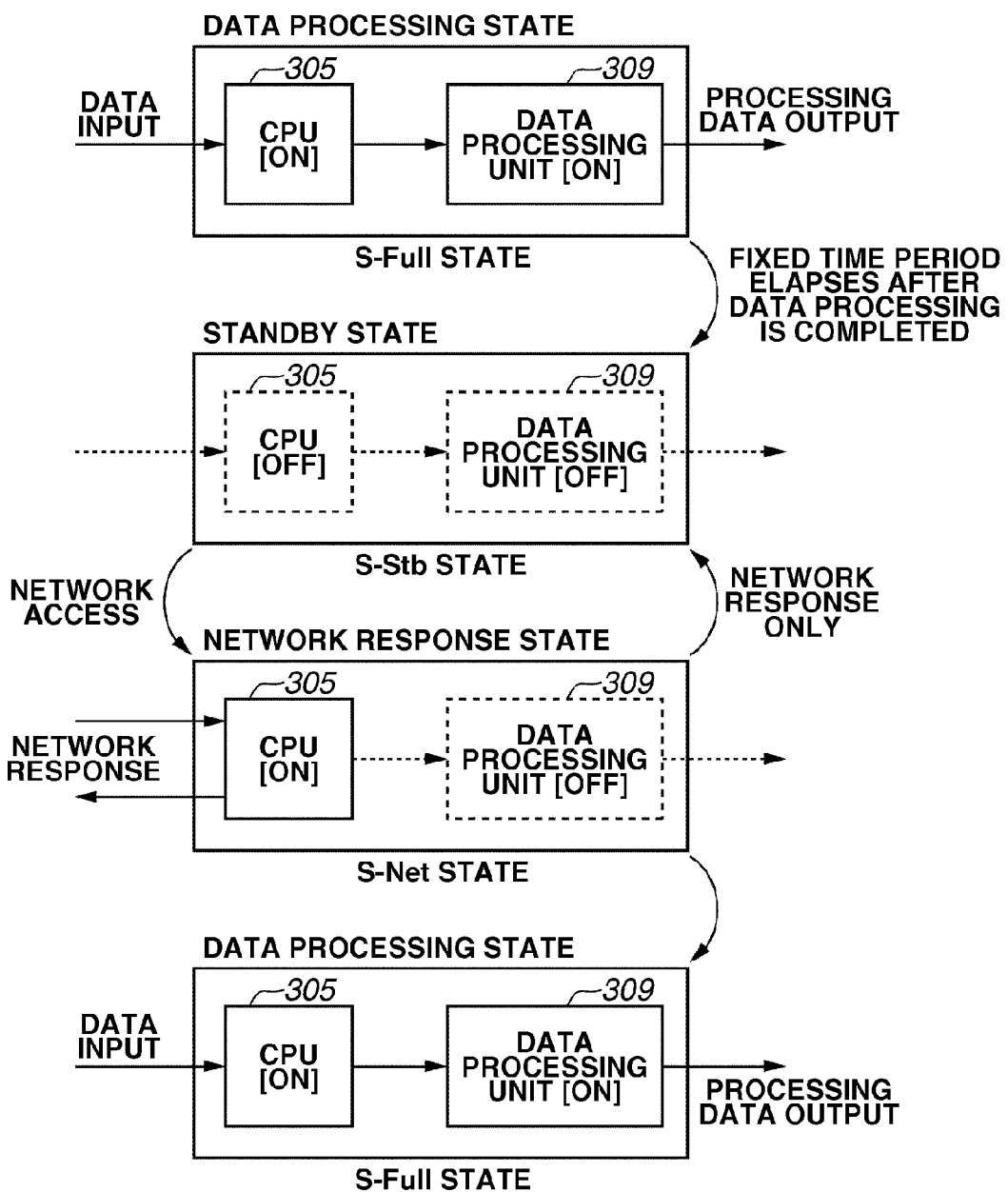
FIG. 21 illustrates changes in state in a case where the power supply of the MFP control unit is controlled with three states (such as S-Full state, S-Stb state, and S-Net state) illustrated in FIGS. 17 to 19.
Figure 22:
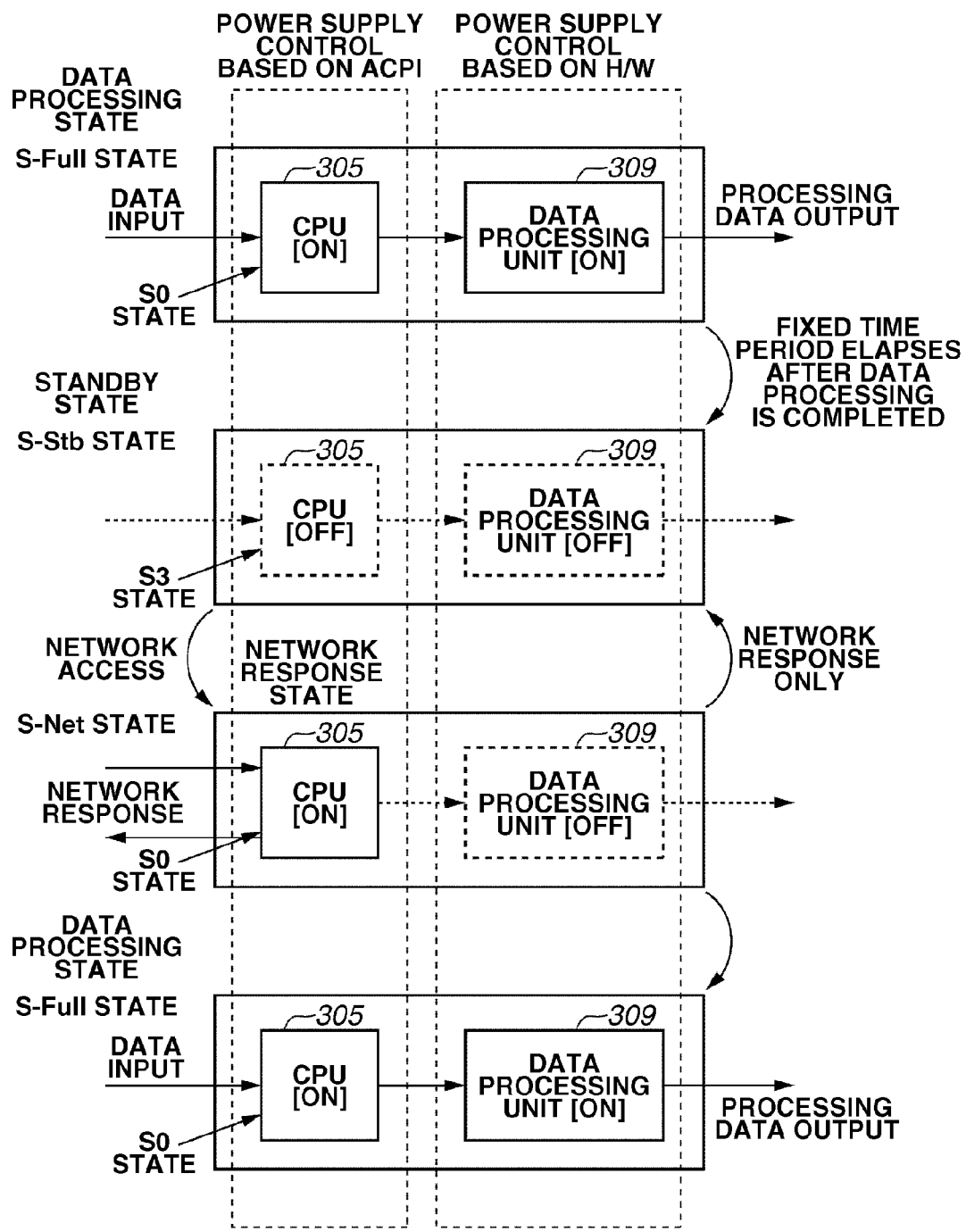
FIG. 22 illustrates changes in the state of the MFP control unit in a case where a system operation is performed when the control in two states based on the ACPI is compatible with the control of three states for saving power as a hardware configuration.
Figure 23:
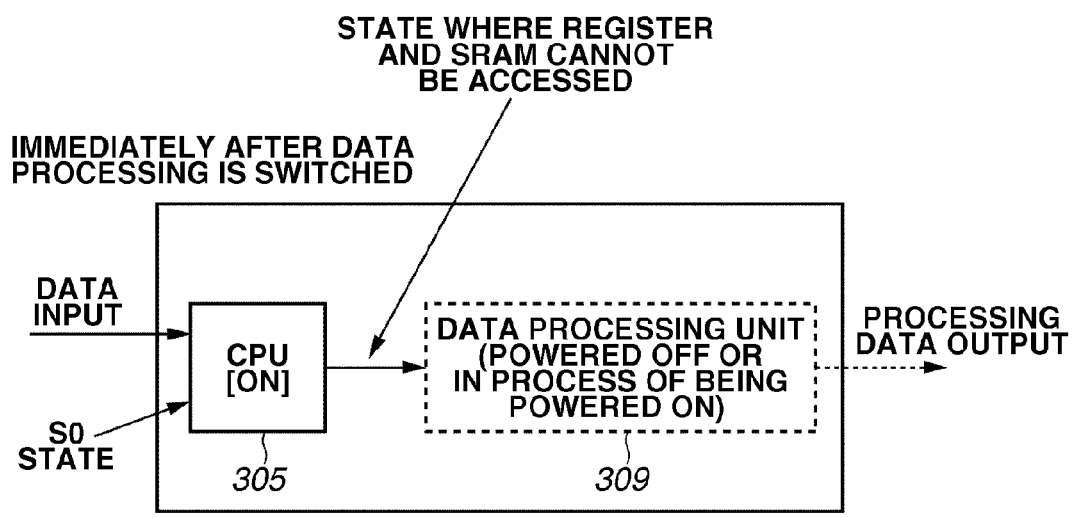
FIG. 23 illustrates a time-out error of the CPU.

In FIG. 1, an MFP control unit 1200 acts as an information processing apparatus and controls an MFP as illustrated in FIG. 15. A controller unit 1201 includes a central processing unit (CPU) 1207 and performs control such as transfer of data with an external interface (not illustrated), setting of contents to be processed in a data processing unit 1202, and input of data to be processed.

The controller unit 1201 is equipped with a clock supply unit 1208 for supplying a clock signal which drives the CPU 1207. The clock supply unit 1208 has a function to switch a clock frequency supplied to the CPU 1207 by inputting a controller-unit control signal 1209 described below. The data processing unit 1202 includes a plurality of data processing modules (Module-A 1203, Module-B 1204, and Module-C 1205) and a power supply control unit 1206. The data processing modules in the data processing unit 1202 are not limited to the three ones of Module-A 1203, Module-B 1204, and Module-C 1205. The data processing unit 1202 may include less than three data processing modules or four data processing modules or more.

Each data processing module is formed of a combinational circuit and a static random access memory (SRAM) for table conversion. Each data processing module is provided with a power supply switch for switching turning on or off the power supply. Powering on or off each data processing module is controlled by the control of the power supply control unit 1206 described below.

Each data processing module is connected to the controller unit 1201 via a register bus and performs predetermined data processing by the controller unit 1201 accessing the register and setting data to the SRAM.

The data processing modules include data input output terminals (not illustrated) and perform predetermined processing as a system by connecting their respective input output terminals with one another.

The present exemplary embodiment takes an example in which the data processing modules are connected to each other in series, the controller unit 1201 inputs data to the Module-A 1203, and the Module-C 1205 outputs processed data. The outputs of the data processing modules may be branched and connected to the input terminals of a plurality of data processing modules to perform selective processing or parallel processing.

When the controller unit 1201 completes the register and the SRAM setting via the register bus, the data processing modules and then input data to be processed are input via an input data bus, the data processing modules execute the predetermined processing and output processed data via an output data bus.

The power supply control unit 1206 controls powering on or off of each data processing module in the data processing unit 1202. The controller unit 1201 and the power supply control unit 1206 in the data processing unit 1202 are powered on or off according to power control by software based on the ACPI. Each data processing module in the data processing unit 1202 is powered on or off according to hardware control by the power supply control unit 1206 and not in compliance with the power control by software based on the ACPI.

Since the CPU 1207 of the controller unit 1201 operates according to the power control based on the ACPI, the CPU 1207 accesses each data processing module irrespective of the states of the power supply (i.e., the power supply is turned on or off). If the CPU 1207 accesses a data processing module but does not receive a response from the accessed data processing module after time-out elapses, the CPU 1207 recognizes this as an error.

Figure 2:
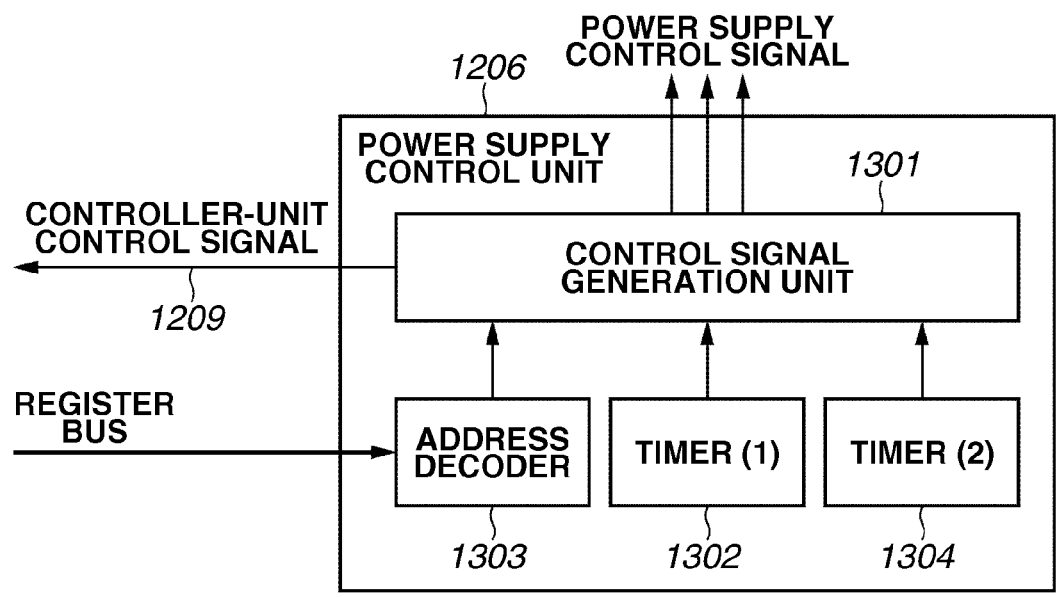
FIG. 2 is a block diagram illustrating an example of a configuration of a power supply control unit.

FIG. 2 is a block diagram illustrating an example of a configuration of the power supply control unit 1206. The power supply control unit 1206 includes a control signal generation unit 1301, a timer (1) 1302, an address decoder 1303, and a timer (2) 1304. The control signal generation unit 1301 outputs a power supply control signal. The power supply control unit 1206 turns on or off power supply switches in the data processing modules 1203, 1204, and 1205.

The power supply control unit 1206 is connected to the register bus and the power supply control unit 1206 itself can be set. The address decoder 1303 can recognize to which data processing module an access is directed.

A clock signal (not shown) (with a fixed frequency) is supplied to the timer (1) 1302. Counting the clock signal allows time to be measured (timing). If neither the register is accessed nor data are input after the data processing unit 1202 completes processing and time preset to the timer (1) 1302 elapses, the control signal generation unit 1301 switches the power supply control signal to power off all data processing modules in the data processing unit 1202.

A clock signal (not shown) (with a fixed frequency) is also supplied to the timer (2) 1304. Counting the clock signal allows time to be measured (timing). The use of the timer (2) 1304 is described below.

Figure 3:
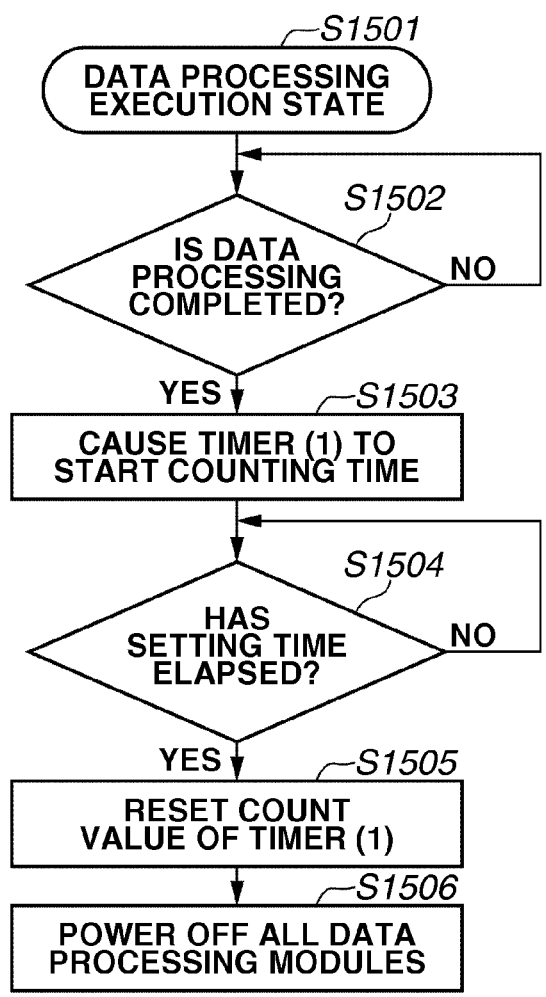
FIG. 3 is a flow chart illustrating an example of turning off the power supply in the power supply control unit.

Turning off the power supply in the power supply control unit 1206 is described below with reference to FIG. 3. FIG. 3 is a flow chart illustrating an example of turning off the power supply in the power supply control unit 1206. In step S1502, the control signal generation unit 1301 in the power supply control unit 1206 determines whether data processing is completed from a state where the data processing unit 1202 processes data in step S1501. The control signal generation unit 1301 determines that data processing is completed based on the following method.

For example, in a configuration in which each data processing module sets a predetermined value to the register area of its own when the data processing is finished, the control signal generation unit 1301 checks the value of the register area in each data processing module to determine whether the data processing is completed. In a configuration in which each data processing module outputs a predetermined signal to the control signal generation unit 1301 while the data processing is being executed, the control signal generation unit 1301 may check the signal to determine whether the data processing is completed.

If the control signal generation unit 1301 determines that the data processing is not completed (NO in step S1502), then in step S1502, the control signal generation unit 1301 again determines whether the data processing is completed.

If the control signal generation unit 1301 determines that the data processing is completed (YES in step S1502), then in step S1503, the control signal generation unit 1301 causes the timer (1) 1302 to start counting time.

In step S1504, the control signal generation unit 1301 determines whether the time set to the timer (1) 1302 (setting time) has elapsed. If the control signal generation unit 1301 determines that the setting time does not yet elapse (NO in step S1504), the control signal generation unit 1301 again determines whether the setting time elapses.

If the control signal generation unit 1301 determines that the setting time has elapsed (YES in step S1504), the control signal generation unit 1301 advances the processing to step S1505. In step S1505, the control signal generation unit 1301 resets the count value of the timer (2) 1302. In step S1506, the control signal generation unit 1301 outputs the power supply control signal to power off all data processing modules in the data processing unit 1202.

Thus, the power supply control unit 1206 powers off the data processing module that is not in use. Turning on the power supply in the power supply control unit 1206 is described below. As described above, if the controller unit 1201 sets the register to perform the following data processing when all data processing modules are powered off, the power supply control unit 1206 recognizes that the register is set to power on the data processing module required for processing. The control is performed as described below.

When access via the register bus is input to the address decoder 1303 in the power supply control unit 1206 from the controller unit 1201, the address decoder 1303 recognizes the accessed address and outputs the address to the control signal generation unit 1301.

The control signal generation unit 1301 recognizes to which data processing module an access is directed based on address information input from the address decoder 1303 and outputs the power supply control signal for powering on the data processing module to be accessed.

FIG. 4 illustrates an address map of each module in the data processing unit 1202. In the present exemplary embodiment, the bit width of an address bus is 14 bits of 0 to 13. The area of the address used in the register of the Module-A 1203 is taken as address "0x0000" to "0x0FFF." The area of the address used in the register of the Module-B 1204 is taken as address "0x1000" to "0x1FFF." The area of the address used in the register of the Module-C 1205 is taken as address "0x2000" to "0x2FFF." The area of the address used in the register of the power supply control unit 1206 itself is taken as address "0x3000" to "0x3FFF."

For the address map illustrated in FIG. 4, the address decoder 1303 in the power supply control unit 1206 decodes the input address and supplies the decoded address information to the control signal generation unit 1301. The control signal generation unit 1301 recognizes to which data processing module an access is directed based on the 12th-bit and 13-bit information of the address information received from the address decoder 1303. For example, if the 12th bit is "0" and the 13th bit is "0," the control signal generation unit 1301 recognizes that the Module-A 1203 is accessed. If the 12th bit is "0" and the 13th bit is "1," the control signal generation unit 1301 recognizes that the Module-B 1204 is accessed. If the 12th bit is "1" and the 13th bit is "0," the control signal generation unit 1301 recognizes that the Module-C 1205 is accessed. If the 12th bit is "1" and the 13th bit is "1," the control signal generation unit 1301 recognizes that the power supply control unit 1206 itself is accessed.

Based on such address information from the address decoder 1303, the control signal generation unit 1301 recognizes which data processing module the control unit 1201 accesses. The control signal generation unit 1301 outputs the power supply control signal for powering on the accessed data processing module to each data processing module based on the recognition.

Thus, the power supply control unit 1206 detects that the control unit 1201 accesses the register and recognizes the data processing module to be accessed. The power supply control unit 1206 powers on the recognized data processing module to be accessed using the power supply control signal to allow the controller unit 1201 to access the data processing module.

Until the power supply of the data processing module to be accessed is completely boosted after access to the register is detected, the data processing module makes no response. If the controller unit 1201 accesses the data processing unit 1202, but does not receive a response to the access even after a certain period of time elapses, the controller unit 1201 normally determines that the access is not established and stops processing, determining that the time-out error occurred.

In the present exemplary embodiment, the control signal generation unit 1301 in the power supply control unit 1206 generates the controller-unit control signal 1209 to the controller unit 1201 to prevent the time-out error from occurring.

The controller-unit control signal 1209 varies from "0" in the normal state to "1" in a preset period of time. The controller-unit control signal 1209 is the one that controls the clock supply unit 1208 for supplying a clock signal to the CPU 1207 in the controller unit 1201.

If the controller-unit control signal 1209 is "0," the clock supply unit 1208 supplies a clock signal with a frequency for normal processing to the CPU 1207. While the controller-unit control signal 1209 is "1," the clock supply unit 1208 supplies a clock signal with a lower frequency to the CPU 1207. This delays the operation of the CPU 1207 in a preset fixed time period, which makes it slower for the CPU 1207 to determine the time-out error than in the normal setting, so that the possibility of producing the time-out error can be reduced until the power supply of the accessed module is completely boosted and a response is sent back.

The timer (2) 1304 measures a time period for which the controller-unit control signal 1209 is "1." The control signal generation unit 1301 determines whether the time period preset to the timer (2) 1304 elapses from a point of time when the controller-unit control signal 1209 is "1." If the preset time period elapses, the control signal generation unit 1301 returns the controller-unit control signal 1209 to "0."

Figure 5:
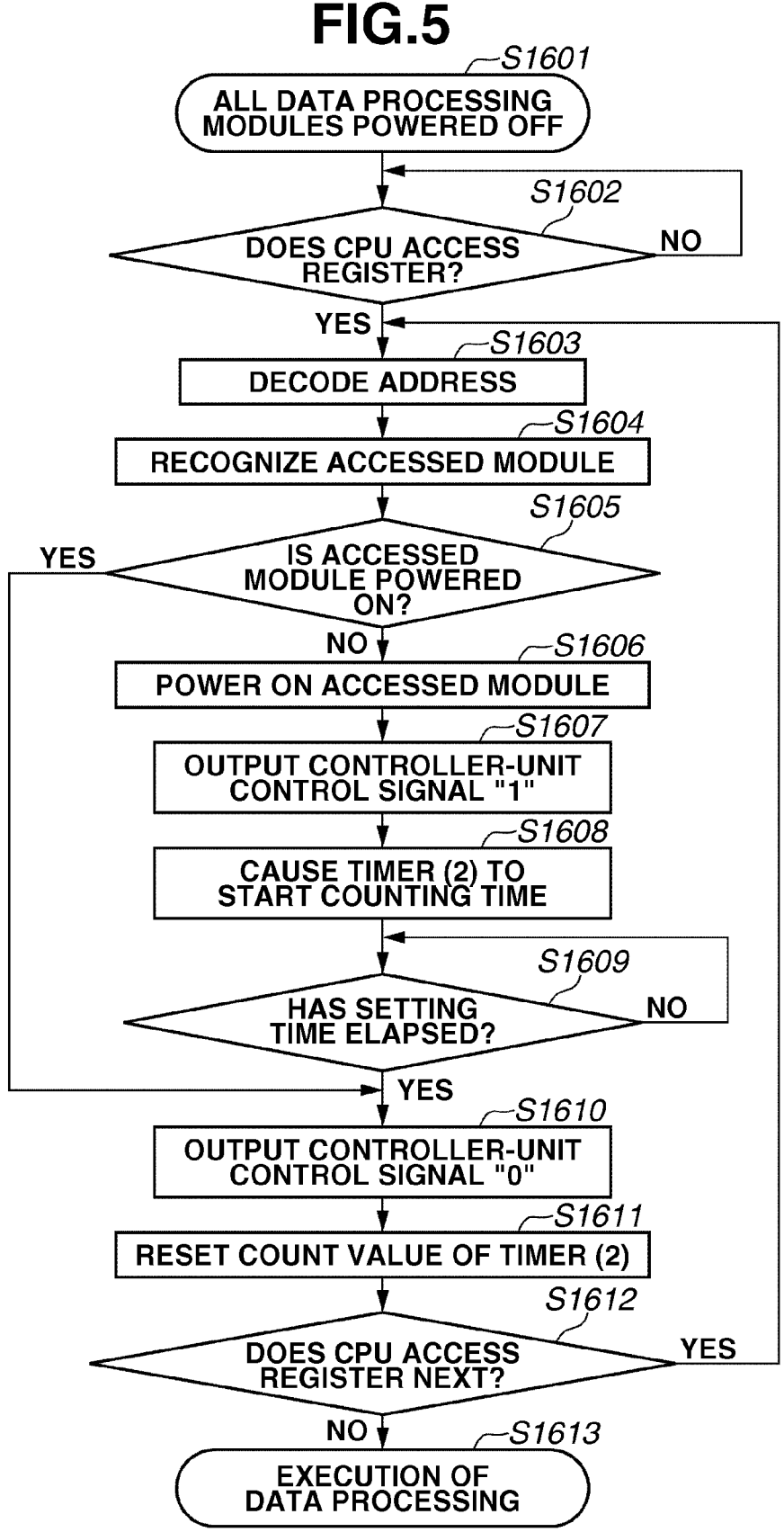
FIG. 5 is a flow chart illustrating an example of turning on the power supply in the power supply control unit.

Turning on the power supply in the power supply control unit 1206 is described below with reference to FIG. 5. FIG. 5 is a flow chart illustrating an example of turning on the power supply in the power supply control unit 1206. When all data processing modules are powered off in step S1601, if the CPU 1207 in the controller unit 1201 accesses the register (YES in step S1602), then in step S1603, the address decoder 1303 in the power supply control unit 1206 decodes the input address and supplies the address information to the control signal generation unit 1301.

In step S1604, the control signal generation unit 1301, receiving the address information from the address decoder 1303, recognizes to which data processing module an access is directed based on the address information.

In step S1605, the control signal generation unit 1301 determines whether the data processing module to be accessed is powered on based on the recognition processing in step S1604.

If the control signal generation unit 1301 determines that the data processing module to be accessed is powered on (YES in step S1605), then in step S1610, the control signal generation unit 1301 keeps the output value "0" of the controller-unit control signal 1209, and the processing proceeds to step S1611.

If the control signal generation unit 1301 determines that the data processing module to be accessed is powered off (NO in step S1605), the control signal generation unit 1301 advances the processing to step S1606.

In step S1606, the control signal generation unit 1301 outputs the power supply control signal for powering on the data processing module to be accessed. In step S1607, the control signal generation unit 1301 changes the output value of the controller-unit control signal 1209 provided for the controller unit 1201 from "0" to "1" to from the time-out error from occurring. While the controller-unit control signal 1209 provided by the control signal generation unit 1301 is "1," the clock supply unit 1208 in the controller unit 1201 supplies a clock signal with a lower frequency to the CPU 1207. This delays the operation of the CPU 1207 by the preset fixed time period. Accordingly, the time that elapses before the time out of the CPU 1207 occurs can be substantially extended to prevent the occurrence of a time-out error, without a special modification provided for the software for operating the CPU 1207.

After the control signal generation unit 1301 changes the controller-unit control signal 1209 from "0" to "1" instep S1607, in step S1608, the control signal generation unit 1301 causes the timer (2) 1304 to start counting time.

In step S1609, the control signal generation unit 1301 determines whether the count of the timer (2) 1304 reaches a preset time period. If the control signal generation unit 1301 determines that the count of the timer (2) 1304 has not yet reached the preset time period (NO in step S1609), the control signal generation unit 1301 again determines whether the count of the timer (2) 1304 reaches the preset time period.

If the control signal generation unit 1301 determines that the count of the timer (2) 1304 reaches the preset time period (YES in step S1609), then in step S1610, the control signal generation unit 1301 sets the output value of the controller-unit control signal 1209 to "1" and advances the processing to step S1611.

In step S1611, the control signal generation unit 1301 resets the count value of the timer (2) 1304. After that, if the CPU 1207 in the controller unit 1201 accesses the register (YES in step S1612), then in step S1603, the address decoder 1303 in the power supply control unit 1206 decodes the input address and supplies the address information to the control signal generation unit 1301. The address decoder 1303, receiving the address information from the address decoder 1303, executes processing in steps S1604 to S1611.

If the CPU 1207 in the controller unit 1201 does not access the register (NO in step S1612) after the processing in step S1611, which means that the setting of each data processing module by access to the register is completed. In step S1613, data for processing are input from the CPU 1207 via the input data bus, and the data processing modules execute data processing.

As described above, the power supply control unit 1206 powers on the data processing module accessed by the controller unit 1201, sets the output value of the controller-unit control signal 1209 to "1," and outputs the controller-unit control signal 1209 to the controller unit 1201. The power supply control unit 1206 outputs the value of the controller-unit control signal 1209 of "1" only for a predetermined time period after the data processing module is powered on. Although described below, the above predetermined time period for which the value of the controller-unit control signal 1209 is set at "1" is at least a differential time between the time required until the data processing module is completely powered on and the time-out time of the CPU 1207.

Figure 6:
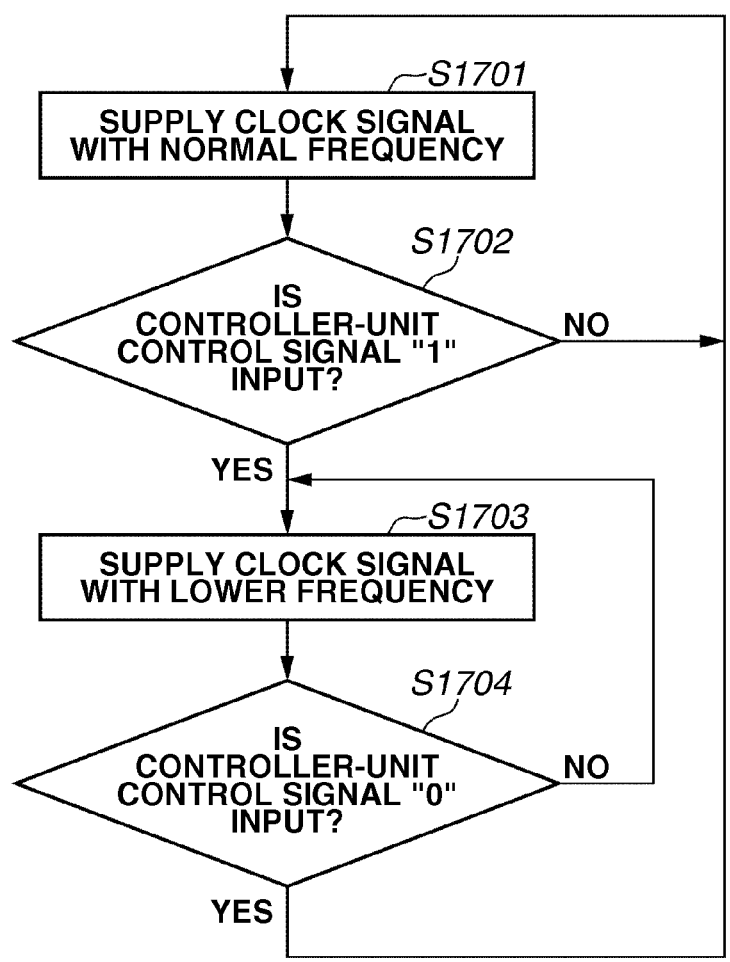
FIG. 6 is a flow chart illustrating an example of the operation of a controller unit by switching a controller-unit control signal.

The operation of the controller unit 1201 using the switching of the controller-unit control signal 1209 is described below with reference to FIG. 6. FIG. 6 is a flow chart illustrating an example of the operation of the controller unit 1201 by switching the controller-unit control signal 1209. In a normal default state, the controller-unit control signal 1209 is "0." At that point, in step 51701, the clock supply unit 1208 supplies a clock signal with a normal frequency (a first frequency).

If the controller-unit control signal 1209 is "0," (NO in step S1702), then in step S1701, the clock supply unit 1208 supplies the clock signal with the normal frequency as it is. If the controller-unit control signal 1209 is "1," (YES in step S1702), then in step S1703, the clock supply unit 1208 supplies the clock signal with a frequency lower than the normal frequency (a second frequency lower than the first frequency).

If the controller-unit control signal 1209 is "1," (NO in step S1704), then in step S1703, the clock supply unit 1208 supplies the clock signal with the frequency lower than the normal frequency as it is. If the controller-unit control signal 1209 is returned to "0," (YES in step S1704), then in step S1701, the clock supply unit 1208 again switches the clock signal for outputting and supplies the clock signal with the normal frequency.

The CPU 1207 counts clock signals supplied from the clock supply unit 1208 by the number of the clock signals corresponding to the time-out time to measure the time-out time. For this reason, when the controller-unit control signal 1209 input to the controller unit 1201 is "1," the operation of counting in the CPU 1207 delays to delay the CPU 1207 recognizing the time-out error.

A specific example of a value set to the timer (2) 1304 is described below in a case where the power supply is actually controlled in the above configuration. It is assumed that the clock supply unit 1208 in the controller unit 1201 outputs a clock signal of "200 MHz" to the CPU 1207 in a normal operation or a clock signal of "50 MHz" thereto in a slow operation. It is assumed that a clock signal of "200 MHz" (not illustrated) is input to the power supply control unit 1206 in the data processing unit 1202 and the clock signal is input to the timer (1) 1302 and the timer (2) 1304.

It is assumed that the circuit scale of the Module-A 1203 is about one million gates and the boosting time of the power supply is "28 μsec." It is assumed that the circuit scale of the Module-B 1204 is about 1.5 million gates and the boosting time of the power supply is "42 μsec." It is assumed that the circuit scale of the Module-C 1205 is about two million gates and the boosting time of the power supply is "56 μsec."

If the CPU 1207 does not receive a response within "15 μsec" after its access, the CPU 1207 recognizes that the normal time-out error for the access of the CPU 1207 occurs. More specifically, if no response is received even after "3000 cycles" are counted by the clock signal of "200 MHz" normally operating the CPU 1207, the CPU 1207 recognizes that the time-out error occurs.

The following describes how the time-out error is prevented by controlling the power supply in consideration of the boosting time of the power supplies of the data processing modules in the present exemplary embodiment under the above conditions.

For the Module-A 1203, the boosting time of the power supply is set to "28 μsec," so that the time that elapses before the CPU 1207 recognizes the time-out error is set to "30 μsec." More specifically, the time period of 30 μsec elapsing before the CPU 1207 recognizes the time-out error can be created by counting 2000 cycles using a clock signal of the normal 200 MHz, one cycle of which is 5 nsec, among counts of 3000 cycles in the CPU 1207 and counting the rest, 1000 cycles, using a clock signal of the lower 50 MHz, one cycle of which is 20 nsec. Therefore, the time period for which the controller-unit control signal 1209 from the power supply control unit 1206 is "1" is "20 μsec", which is obtained by counting 1000 cycles using a clock signal of the lower 50 MHz, one cycle of which is 20 nsec. Therefore, the count value of the timer (2) 1304 in the power supply control unit 1206 is set to 4000 cycles for the clock signal of 200 MHz, one cycle of which is 5 μsec, and "1" is output to the controller-unit control signal 1209 only for the time period of 20 μsec.

Similarly, for the Module-B 1204, the boosting time of the power supply is set to "42 μsec," so that the time that elapses before the CPU 1207 recognizes the time-out error is set to "45 μsec." More specifically, the time period of 45 μsec elapsing before the CPU 1207 recognizes the time-out error can be created by counting 1000 cycles using a clock signal of the normal 200 MHz, one cycle of which is 5 nsec, among counts of 3000 cycles in the CPU 1207 and counting the rest, 2000 cycles, using a clock signal of the lower 50 MHz, one cycle of which is 20 nsec. Therefore, the time period for which the controller-unit control signal 1209 from the power supply control unit 1206 is "1" is "40 μsec", which is obtained by counting 2000 cycles using a clock signal of the lower 50 MHz, one cycle of which is 20 nsec. Therefore, the count value of the timer (2) 1304 in the power supply control unit 1206 is set to 8000 cycles for the clock signal of 200 MHz, one cycle of which is 5 nsec, and "1" is output to the controller-unit control signal 1209 only for the time period of 40 μsec.

Similarly, for the Module-C 1205, the boosting time of the power supply is set to "56 μsec," so that the time that elapses before the CPU 1207 recognizes the time-out error is set to "60 μsec." More specifically, the time period of 60 μsec elapsing before the CPU 1207 recognizes the time-out error can be created by counting all cycles using a clock signal of the normal 50 MHz, one cycle of which is 20 nsec, among counts of 3000 cycles in the CPU 1207. Therefore, the time period for which the controller-unit control signal 1209 from the power supply control unit 1206 is "1" is "60 μsec", which is obtained by counting 3000 cycles using a clock signal of the lower 50 MHz, one cycle of which is 20 nsec. Therefore, the count value of the timer (2) 1304 in the power supply control unit 1206 is set to 12000 cycles for the clock signal of 200 MHz, one cycle of which is 5 nsec, and "1" is output to the controller-unit control signal 1209 only for the time period of 60 μsec.

The power supply control unit 1206 determines which data processing module is to be powered on based on information about the accessed address bus to control the power supply control signal and generates the controller-unit control signal 1209 according to the boosting time of the power supply of the data processing module for which the power supply is turned on. Since the clock signal of the CPU 1207 is switched by the controller-unit control signal 1209, the time required for the recognition of the time-out error is later than the boosting time of the power supply.

A configuration is described above in which the count value of the timer (2) 1304 is changed for each data processing module to be accessed. No matter which data processing module is accessed, the count value of the timer (2) 1304 may be set to a constant value according to the data processing module (the Module-C 1205 in the above example) that is the longest in the boosting time of its power supply.

Thus, the time set to the timer (2) 1304 for which the value of the controller-unit control signal 1209 is set at "1" is at least a difference time between the time required until the data processing module is completely powered on and the time-out time of the CPU 1207.

In the above description, if the clock supply unit 1208 recognizes that the controller-unit control signal 1209 is "1," the clock supply unit 1208 "supplies the clock signal with the frequency lower than the normal frequency." "Supplying the clock signal with the frequency lower than the normal frequency" in the description includes the operation that "stops supplying the clock signal." In other words, the present exemplary embodiment also includes a configuration in which the clock supply unit 1208 stops supplying the clock signal while the controller-unit control signal 1209 is "1."

In the present exemplary embodiment, as described above, the clock signal supplied to the CPU 1207 in the controller unit 1201 is controlled to delay the CPU 1207 recognizing the time-out error. This allows the time-out error to be prevented from occurring in controlling and boosting the power supply performed by the power supply control unit 1206 in the data processing unit 1202 due to delay in access of the register. For this reason, the software is accessible without regard to the power-supply status in the data processing unit 1202.

The first present exemplary embodiment describes the configuration in which the frequency of the clock signal supplied from the clock supply unit 1208 in the controller unit 1201 to the CPU 1207 is controlled by the controller-unit control signal 1209 to delay the CPU 1207 recognizing the time-out error.

In a second exemplary embodiment of the present invention, instead of a clock signal supplied from a clock supply unit to a CPU, a clock signal supplied to a counter for recognizing the time-out error in the CPU, is controlled to delay the CPU recognizing the time-out error.

Figure 7:
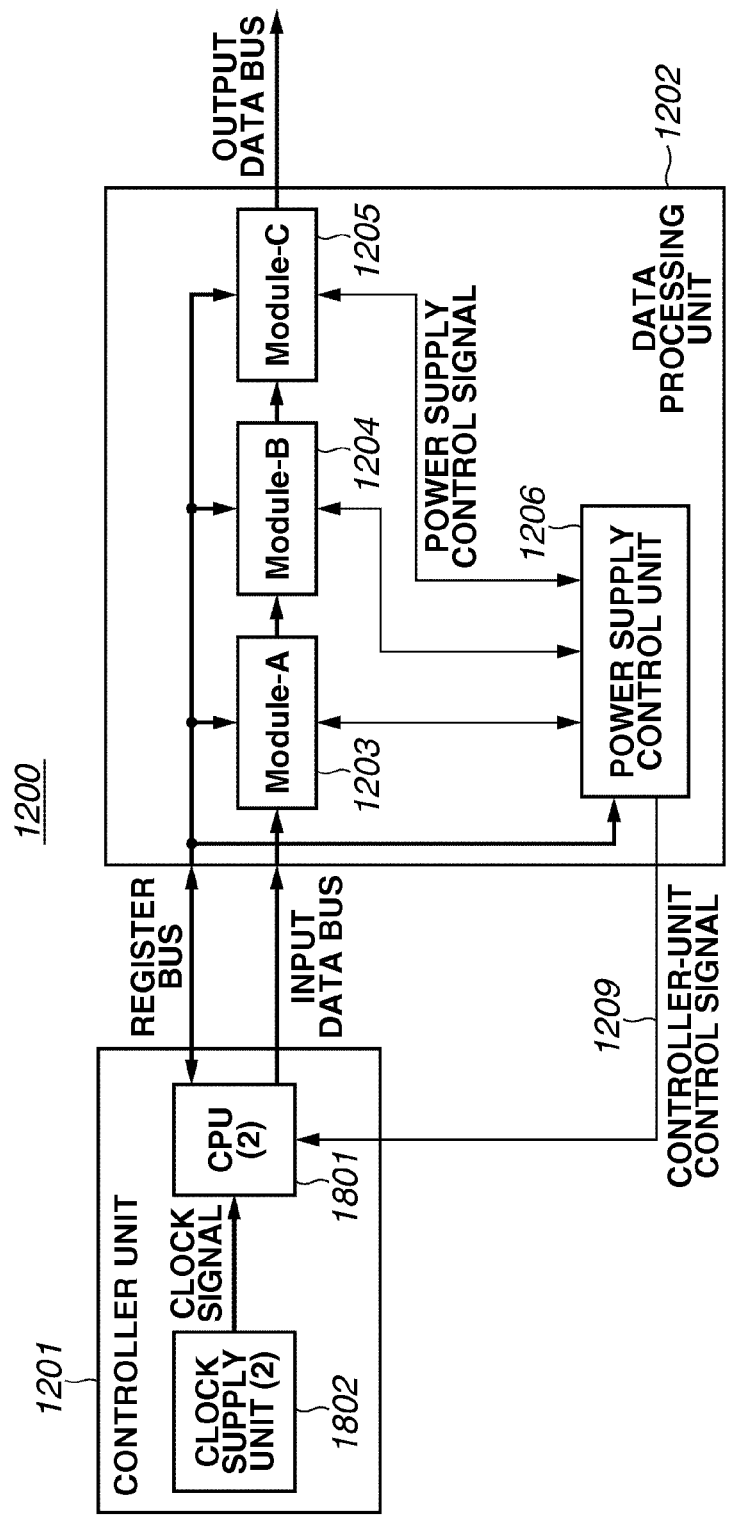
FIG. 7 illustrates an example of a configuration of a control unit (MFP control unit) of a multifunction peripheral (MFP) acting as an information processing apparatus according to a second exemplary embodiment of the present invention.

FIG. 7 is a block diagram illustrating an example of a configuration of a control unit (MFP control unit) of a multi-function peripheral (MFP) acting as an information processing apparatus according to the second exemplary embodiment. Only portions related to the present exemplary embodiment are illustrated herein. The MFP excluding the MFP control unit is similar in configuration to the one that is illustrated in FIG. 15. The portions described in the first exemplary embodiment are given the same reference numbers as in FIG. 1 to omit the detailed description thereof in the second exemplary embodiment. The second exemplary embodiment is characterized by the configuration of the controller unit 1201, so that the detailed description of the data processing unit 1202 is omitted.

A clock supply unit (2) 1802 supplies a driving clock signal to a CPU (2) 1801. In the second exemplary embodiment, the clock supply unit (2) 1802 has no function to switch frequencies and supplies a clock signal with a fixed frequency to the CPU (2) 1801. The configuration of the CPU (2) 1801 is described below.

Figure 8:
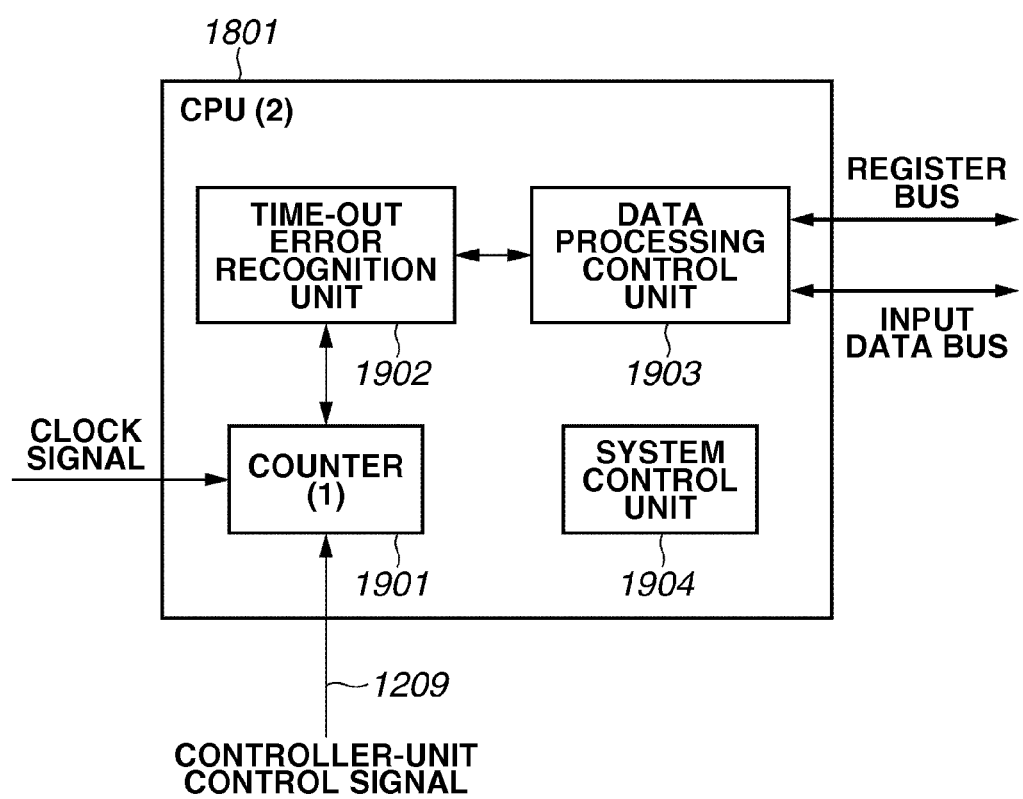
FIG. 8 is a block diagram illustrating an example of a configuration of a CPU (2) according to the second exemplary embodiment of the present invention.

FIG. 8 is a block diagram illustrating an example of a configuration of the CPU (2) 1801 according to the second exemplary embodiment. As illustrated in FIG. 8, the CPU (2) 1801 includes a counter (1) 1901, a time-out error recognition unit 1902, a data processing control unit 1903, and a system control unit 1904.

The counter (1) 1901 receives a clock signal from the clock supply unit (2) 1802 and performs counting. The time-out error recognition unit 1902 recognizes the time-out error based on the value counted by the counter (1) 1901. The data processing control unit 1903 transfers data with the data processing unit 1202. The system control unit 1904 controls the entire system including the CPU (2) 1801.

In the second exemplary embodiment, the controller-unit control signal 1209 output from the power supply control unit 1206 in the data processing unit 1202 is input to the counter (1) 1901 in the CPU (2) 1801 in the controller unit 1201.

The counter (1) 1901 includes a frequency divider (not illustrated) for a clock signal. If the controller-unit control signal 1209 is "0," the counter (1) 1901 operates in a normal operation mode to count time based on the clock signal input from the clock supply unit (2) 1802. If the controller-unit control signal 1209 is "1," the counter (1) 1901 operates in a frequency division operation mode in which the counter (1) 1901 is operated by a frequency lower than the one in the normal operation by dividing the frequency of the clock signal input from the clock supply unit (2) 1802.

In other words, if the controller-unit control signal 1209 is "0," the counter (1) 1901 counts time in the normal operation mode based on the clock signal supplied from the clock supply unit (2) 1802. If the controller-unit control signal 1209 is "1, " on the other hand, the counter (1) 1901 counts time in the frequency division operation mode by a clock signal with a lower frequency in which the frequency of the clock signal input from the clock supply unit (2) 1802 is divided.

When the count value reaches the preset value, the time-out error recognition unit 1902 determines that the time-out time has elapsed based on the count value of the counter (1) 1901 and recognizes that the time-out error occurs.

In the second exemplary embodiment, the value is preset to the counter (1) 1901 with it taken into consideration that the power supply boosting time of the processing module that is longer in the power supply boosting time than any other processing modules in the data processing unit 1202 is counted by a frequency division operation.

Figure 9:
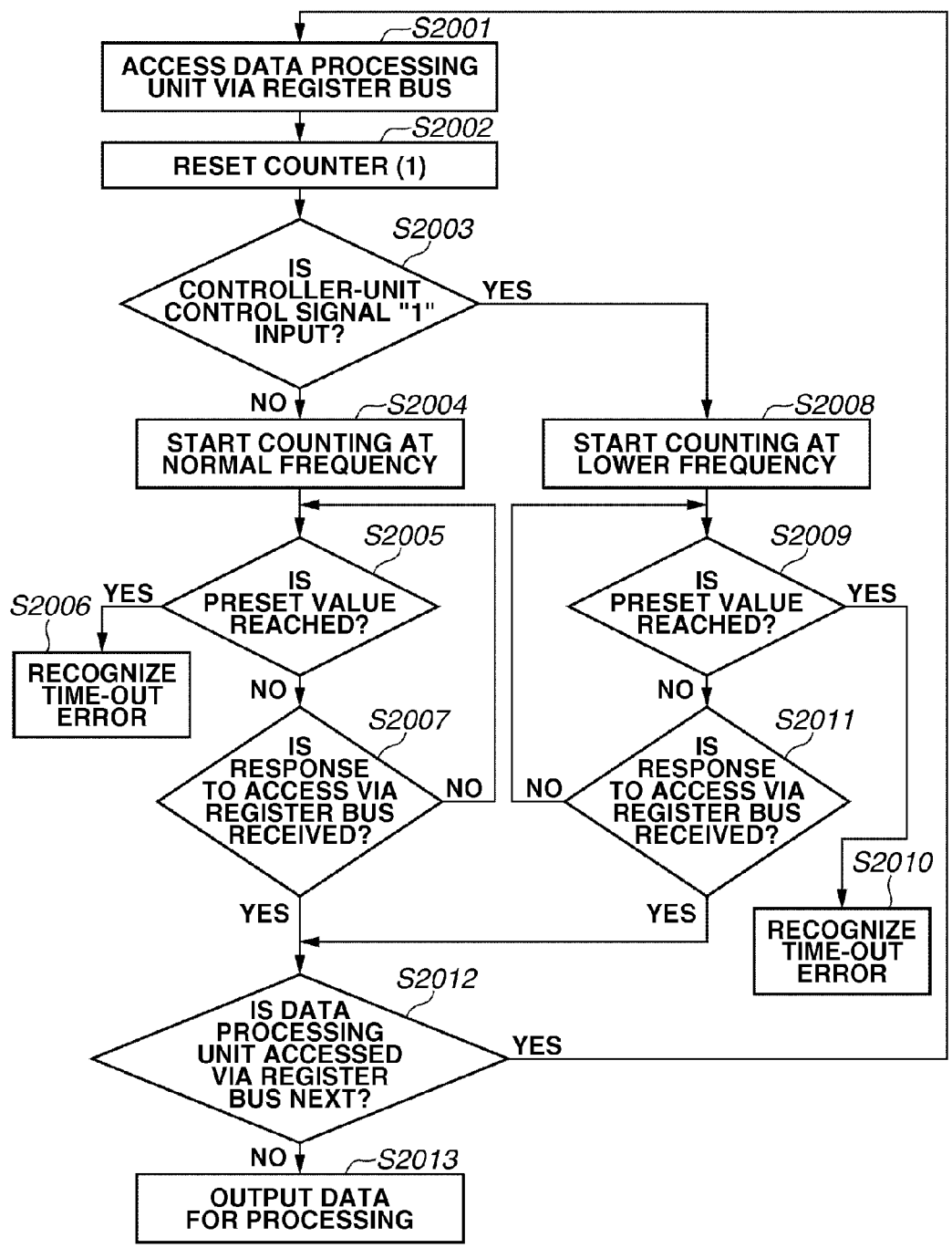
FIG. 9 is a flow chart illustrating an example of an operation of the controller unit in the second exemplary embodiment of the present invention.

The operation of the controller unit 1201 in the second exemplary embodiment is described with reference to FIG. 9. FIG. 9 is a flow chart illustrating an example of an operation of the controller unit 1201 according to the second exemplary embodiment. In step S2001, when the system control unit 1904 causes the data processing control unit 1903 to access the data processing unit 1202 via the register bus, then in step S2002, the time-out error recognition unit 1902 resets the value of the counter (1) 1901.

In steps S2004 and S2008, the time-out error recognition unit 1902 causes the counter (1) 1901 to start counting time. If the controller-unit control signal 1209 is "0" (NO in step S2003), then in step S2004, the counter (1) 1901 counts time at a normal frequency. If the controller-unit control signal 1209 is "1" (YES instep S2003), the CPU (2) 1801 delays the recognition of the time-out error by delaying the count of the counter (1) 1901 because the data processing unit 1202 is controlling boosting of the power supply in response to the access via the register bus. In this case, in step S2008, the counter (1) 1901 counts time at a lower frequency divided by a frequency divider (not illustrated).

In steps S2005 and S2009, the time-out error recognition unit 1902 determines whether the count value of the counter (1) 1901 reaches the preset value. If the time-out error recognition unit 1902 determines that the count value of the counter (1) 1901 reaches the preset value (YES in step S2005 or S2009), then in step S2006 or S2010, the time-out error recognition unit 1902 recognizes that the time-out error occurs.

If the time-out error recognition unit 1902 determines that the count value of the counter (1) 1901 has not yet reached the preset value (NO in step S2005 or S2009), in step S2007 or S2011, the time-out error recognition unit 1902 checks whether a response to the access is received via the register bus.

If a response to the access has not yet been received via the register bus (NO in step S2007 or S2011), then in step S2005 or S2009, the time-out error recognition unit 1902 again determines whether the count value of the counter (1) 1901 reaches the preset value.

If a response to the access is received via the register bus (YES in step S2007 or S2011), the time-out error recognition unit 1902 recognizes that the time-out error does not occur.

In step S2012, the system control unit 1904 checks whether the register is accessed next. If the register is accessed next (YES in step S2012), then in step S2001, the data processing control unit 1903 accesses the data processing unit 1202 via the register bus.

If the register is not accessed next (NO in step S2012), then in step S2013, the system control unit 1904 determines that setting of the register is completed and outputs data for processing via the input data bus using the data processing control unit 1903.

A specific example of a value set to the timer (2) 1304 is described below in a case where the power supply is actually controlled in the above configuration. It is assumed that the counter (1) 1901 in the CPU (2) 1801 uses a clock signal of 200 MHz in a normal operation mode and a clock signal of 50 MHz, in which 200 MHz is divided by four, in a slower operation mode.

The circuit scale of the Module-A 1203 is about one million gates and the boosting time of the power supply is "28 μsec." The circuit scale of the Module-B 1204 is about 1.5 million gates and the boosting time of the power supply is "42 μsec." The circuit scale of the Module-C 1205 is about 0.5 million gates and the boosting time of the power supply is "14 μsec."

In the present exemplary embodiment, the recognition of the time-out error is delayed by 45 μsec so that the boosting time of the Module-B 1204, which is longer in boosting time than any other modules, can be satisfied.

It is recognized as the time-out error accompanied by the access of the CPU (2) 1801 if no response is received in 15 μsec after the CPU (2) 1801 accesses. More specifically, it is regarded as the time-out error if no response is received even when the counter (1) 1901 counts 3000 cycles by a clock signal of 200 MHz normally operating the CPU (2) 1801.

The following describes how the time-out error is prevented by controlling the power supply in consideration of the boosting time of the power supplies of the data processing modules in the present exemplary embodiment under the above conditions.

The time-out error is prevented in the following manner in a case where the time elapsing before the time-out error is recognized after "1" is input from the controller-unit control signal 1209 is taken as 45 μsec. A thousand cycles among 3000 cycles in the counter (1) 1901 are counted using a clock signal of the normal 200 MHz, one cycle of which is 5 nsec. The rest, 2000 cycles, is counted using a clock signal of the lower 50 MHz, one cycle of which is 20 nsec. Such a count is performed to create a time period of 45 μsec elapsing before the time-out error is recognized.

Therefore, the time period for which the controller-unit control signal 1209 from the power supply control unit 1206 is "1" is "40 μsec", which is obtained by counting 2000 cycles using a clock signal of the lower 50 MHz, one cycle of which is 20 nsec.

Therefore, the count value of the timer (2) 1304 in the power supply control unit 1206 is set to 8000 cycles for the clock signal of 200 MHz, one cycle of which is 5 nsec, and "1" is output to the controller-unit control signal 1209 only for the time period of 40 μsec.

As described above, the power supply control unit 1206 determines which data processing module is to be powered on based on information about the address bus accessed by the controller unit 1201 to control the power supply control signal and generates the controller-unit control signal 1209.

Since the clock signal used in the counter (1) 1901 of the CPU (2) 1801 is switched by the controller-unit control signal 1209, the time required for the recognition of the time-out error is later than the boosting time of the power supply.

In the above description, if the controller-unit control signal 1209 is "1," "the counter (1) 1901 counts time using a clock signal having a lower divided frequency." However, the clock signal having a lower frequency is generated by not always using "frequency division." Using the clock signal having a lower frequency includes an operation that "the supply of a clock signal to the counter (1) 1901 is stopped."

Thus, in the second exemplary embodiment, the control of the clock signal supplied to the counter to recognize the time-out error within the CPU (2) 1801 allows the CPU (2) 1801 to delay recognizing the time-out error.

In this configuration, the clock frequency of the clock supply unit (2) 1802 is not changed and only the clock signal used for counting by the counter (1) 1901 is taken as a clock signal having a lower frequency. For this reason, an influence on others operating with the clock signal supplied from the clock supply unit (2) 1802 can be eliminated. In other words, the influence of the CPU (2) 1801's control of other systems on performances can be prevented.

In addition, neither hardware for control needs to be added to the clock supply unit (2) 1802 nor software needs to be controlled.

The second exemplary embodiment describes the configuration in which the frequency of the clock signal is controlled (delayed) by the controller-unit control signal within the CPU in the controller unit to delay the CPU recognizing the time-out error.

As described in second exemplary embodiment, the hardware of the normal CPU needs to be modified to perform special processing. A third exemplary embodiment of the present invention is configured such that interrupt processing, which is normally performed by a CPU, is used to delay the CPU recognizing the time-out error.

Figure 10:
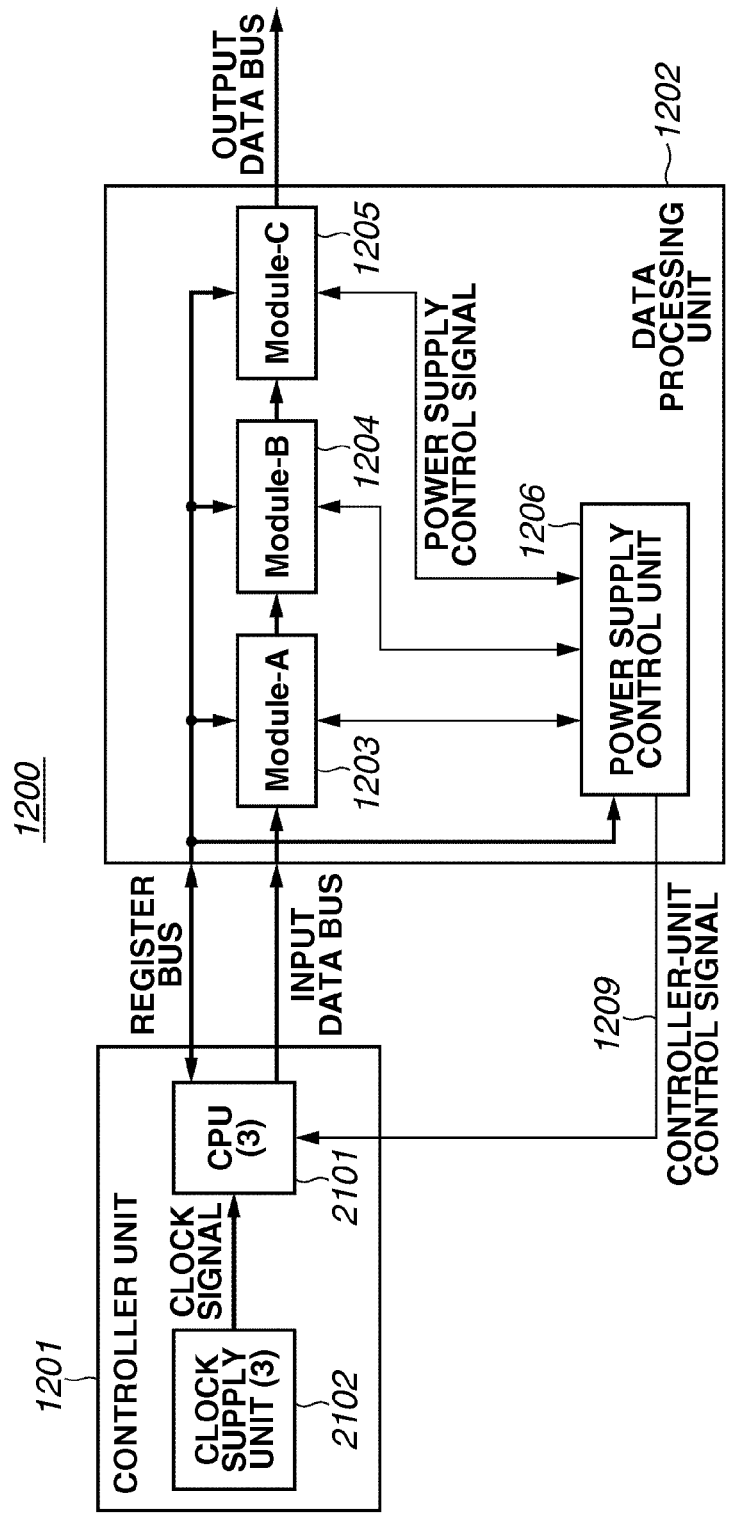
FIG. 10 illustrates an example of a configuration of a control unit (MFP control unit) of a multifunction peripheral (MFP) acting as an information processing apparatus according to a third exemplary embodiment of the present invention.

FIG. 10 is a block diagram illustrating an example of a configuration of a control unit (MFP control unit) of a multi-function peripheral (MFP) acting as an information processing apparatus according to the third exemplary embodiment. Only portions related to the present exemplary embodiment are illustrated herein. The MFP excluding the MFP control unit is similar in configuration to the one that is illustrated in FIG. 15. The portions described in the first exemplary embodiment are given the same reference numbers as in FIG. 1 to omit the detailed description thereof in the third exemplary embodiment. The third exemplary embodiment is characterized by the configuration of the controller unit 1201, so that the detailed description of the data processing unit 1202 is omitted.

A clock supply unit (3) 2102 supplies a driving clock signal to a CPU (3) 2101. In the third exemplary embodiment, the clock supply unit (3) 2102 has no function to switch frequencies and supplies a clock signal with a fixed frequency to the CPU (3) 2101. The configuration of the CPU (3) 2101 is described below.

Figure 11:
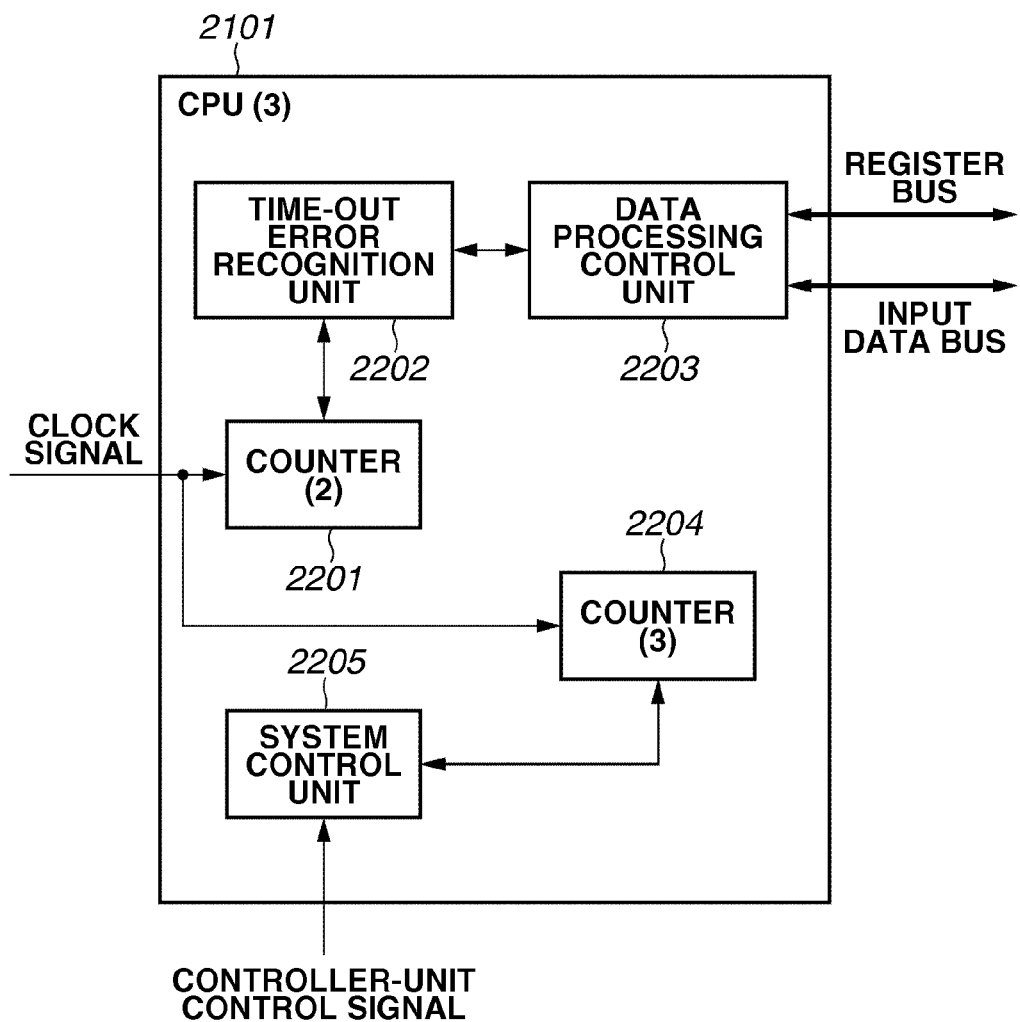
FIG. 11 is a block diagram illustrating an example of a configuration of a CPU (3) according to the third exemplary embodiment of the present invention.

FIG. 11 is a block diagram illustrating an example of a configuration of the CPU (3) 2101 according to the third exemplary embodiment. As illustrated in FIG. 11, the CPU (3) 2101 includes a counter (2) 2201, a time-out error recognition unit 2202, a data processing control unit 2203, a counter (3) 2204, and a system control unit 2205.

The counter (2) 2201 receives a clock signal from the clock supply unit (3) 2102 and counts time based on the clock signal. The time-out error recognition unit 2202 determines that the time-out time elapses when counting reaches the preset value based on the count value of the counter (2) 2201 to recognize the time-out error.

The data processing control unit 1903 sets a register access to the data processing modules in the data processing unit 1202 and outputs data to be processed in the data processing unit 1202. The counter (3) 2204 can be used at the time of interrupt processing for delaying the recognition of the time-out error. The counter (3) 2204 receives a clock signal from the clock supply unit (3) 2102 and executes processing for counting time until the preset value (processing for timing a predetermined time) if the interrupt processing for delaying the recognition of the time-out error occurs. The system control unit 2203 controls the entire system including the CPU (3) 2101. The interrupt processing for delaying the recognition of the time-out error is handled as one of several pieces of preset interrupt processing in the system control unit 2205.

In the third exemplary embodiment, the controller-unit control signal 1209 output from the power supply control unit 1206 in the data processing unit 1202 is input to the system control unit 2205 in the CPU (3) 2101 as an interrupt signal (hardware interrupt).

The controller-unit control signal 1209 of "0" represents a state that the interrupt processing does not occur. The system control unit 2205 performs normal system control, accesses the data processing unit 1202, and outputs data for data processing. On the other hand, the controller-unit control signal 1209 of "1" represents a state that the interrupt processing for delaying the recognition of the time-out error occurs. The system control unit 2205 interrupts the normal processing and performs the count processing of the counter (3) 2204 acting as an interrupt counter for delaying the recognition of the time-out error.

In the present exemplary embodiment, the value is preset to the counter (3) 2204 with it taken into consideration that the power supply boosting time of the processing module that is longer in the power supply boosting time than any other processing modules in the data processing unit 1202 is counted by the clock signal supplied from the clock supply unit (3) 2102.

Figure 12:
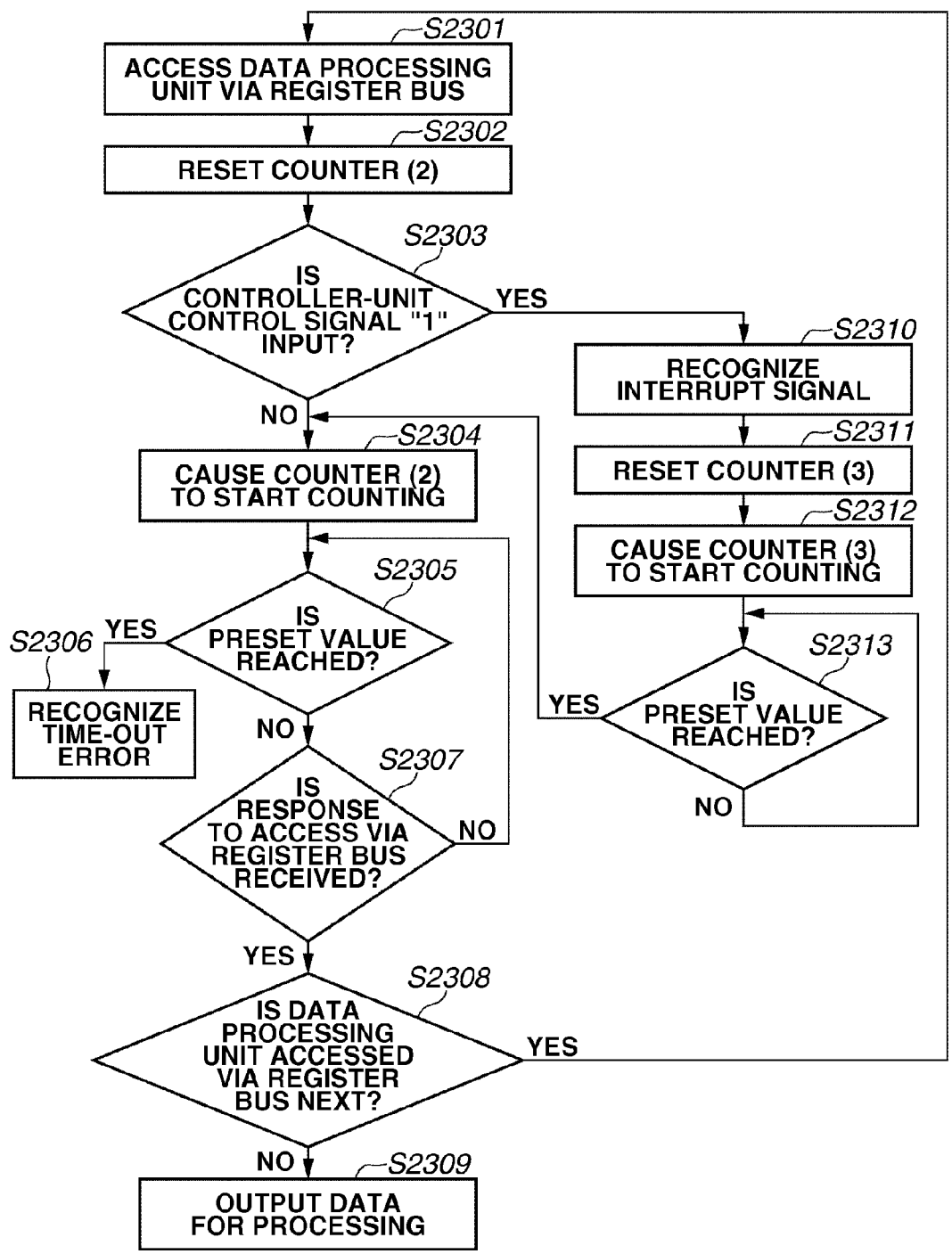
FIG. 12 is a flow chart illustrating an example of an operation of the controller unit in the third exemplary embodiment of the present invention.
Figure 13:
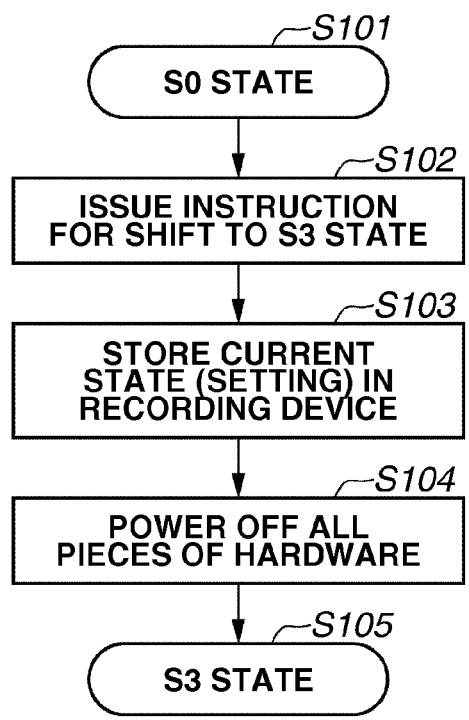
FIG. 13 illustrates the shift of Advanced Configuration and Power Interface (ACPI) control from S0 state to S3 state.
Figure 14:
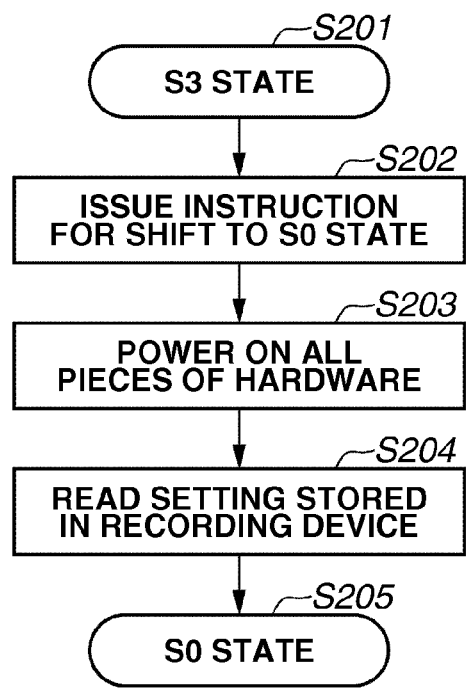
FIG. 14 illustrates the shift of the ACPI control from S3 state to S0 state.

The operation of the controller unit 1201 in the third exemplary embodiment is described with reference to FIG. 12. FIG. 12 is a flow chart illustrating an example of an operation of the controller unit 1201 in the third exemplary embodiment. In step S2301, when the system control unit 2205 causes the data processing control unit 2203 to access the data processing unit 1202 via the register bus, then in step S2302, the time-out error recognition unit 2202 resets the value of the counter (2) 2201.

If the controller-unit control signal 1209 is "0" (NO in step S2303), then in step S2304, the time-out error recognition unit 2202 causes the counter (2) 2201 to start counting time using a clock signal from the clock supply unit (3) 2102.

If the controller-unit control signal 1209 is "0" (NO in step S2303), the system control unit 2205 executes the normal processing (steps S2304 to S2309). The following describes the normal processing (steps S2304 to S2309).

In the normal processing, in step S2304, the time-out error recognition unit 2202 causes the counter (2) 2201 to start counting time using a clock signal from the clock supply unit (3) 2102.

In step S2305, the time-out error recognition unit 2202 determines whether the count value of the counter (2) 2201 reaches the preset value. If the time-out error recognition unit 2202 determines that the count value of the counter (2) 2201 reaches the preset value (YES in step S2305), then in step S2306, the time-out error recognition unit 2202 recognizes that the time-out error occurs.

If the time-out error recognition unit 2202 determines that the count value of the counter (2) 2201 has not yet reached the preset value (NO in step S2305), then in step S2307, the time-out error recognition unit 2202 checks whether a response to the access is received via the register bus.

If a response to the access has not yet been received via the register bus (NO in step S2307), then in step S2305, the time-out error recognition unit 2202 again determines whether the count value of the counter (2) 2201 reaches the preset value.

If a response to the access is received via the register bus (YES in step S2307), the time-out error recognition unit 2202 recognizes that the time-out error does not occur.

In step S2308, the system control unit 2205 checks whether the register is accessed next. If the register is accessed next (YES in step S2308), then in step S2301, the data processing control unit 2203 accesses the data processing unit 1202 via the register bus.

If the register is not accessed next (NO in step S2308, then in step S2309, the system control unit 2205 determines that setting of the register is completed and outputs data for processing via the input data bus using the data processing control unit 2203.

If the controller-unit control signal 1209 is "1" (YES in step S2303), then instep S2310, the system control unit 2205 recognizes that interrupt occurs. In steps S2311 to S2313, the system control unit 2205 interrupts the normal processing to execute the interrupt processing for delaying the recognition of the time-out error. If the controller-unit control signal 1209 is "1," the data processing unit 1202 performs power supply boosting control in response to an access via the register bus. In the CPU (3) 2101, the execution of the normal processing (steps S2304 to S2309) is interrupted by that of the interrupt processing for delaying the recognition of the time-out error (steps S2311 to S2313) to delay the recognition of the time-out error.

The following describes in detail the interrupt processing for delaying the recognition of the time-out error (steps S2311 to S2313). In the interrupt processing for delaying the recognition of the time-out error, in step S2311, the system control unit 2205 resets the value of the counter (3) 2204. In step S2312, the system control unit 2205 causes the counter (3) 2204 to start counting using a clock signal from the clock supply unit (3) 2102.

In step S2313, the system control unit 2205 determines whether the count value of the counter (3) 2204 reaches the preset value. If the system control unit 2205 determines that the count value of the counter (3) 2204 has not yet reached the preset value (NO in step S2313), then in step S2313, the system control unit 2205 again determines whether the count value of the counter (3) 2204 reaches the preset value.

If the system control unit 2205 determines that the count value of the counter (3) 2204 reaches the preset value (YES in step S2313), the system control unit 2205 completes the interrupt processing for delaying the recognition of the time-out error and performs the normal processing (steps S2304 to S2309).

At this point, owing to the interrupt processing for delaying the recognition of the time-out error, the time elapses in which the processing module in the data processing unit 1202 is powered on and a response to the access of the register from the controller unit 1201 is received. Therefore, the response arrives from the register bus, so that the time-out error related to turning on of the power supply does not occur (YES in step S2307).

In step S2308, the system control unit 2205 checks whether the register is accessed next. If the register is accessed next (YES in step S2308), then in step S2301, the data processing control unit 2203 accesses the data processing unit 1202 via the register bus.

If the register is not accessed next (NO in step S2308), then in step S2309, the system control unit 2205 determines that setting of the register is completed and outputs data for processing via the input data bus using the data processing control unit 2203.

The present exemplary embodiment describes a configuration in which processing for counting time until a preset value (processing for counting predetermined time) is executed as the interrupt processing for the case where the interrupt processing for delaying the recognition of the time-out error occurs. However, the interrupt processing for the case where the interrupt processing for delaying the recognition of the time-out error occurs is not limited to the above-mentioned processing for counting time in which the predetermined time is counted, but has only to be processing which takes a predetermined time.

A specific example of values counted by the counter (3) 2204 for the case where a power supply is actually controlled in the above configuration is described below. A clock signal of 200 MHz is supplied to the counter (2) 2201 and the counter (3) 2204 in the CPU (3) 2101 in the normal operation mode. For example, the circuit scale of the Module-A 1203 is about one million gates and the boosting time of the power supply is "28 μsec." The circuit scale of the Module-B 1204 is about 1.5 million gates and the boosting time of the power supply is "42 μsec." The circuit scale of the Module-C 1205 is about 0.5 million gates and the boosting time of the power supply is "14 μsec."

In the present exemplary embodiment, the recognition of the time-out error is delayed up to 45 μsec to satisfy the boosting time of the Module-B 1204, which is longer in the power supply boosting time than any other modules.

If the CPU (3) 2101 does not receive a response within "15 μsec" after its access, the CPU (3) 2101 recognizes that the normal time-out error for the access of the CPU (3) 2101 occurs. In other words, if no response is received even after "3000 cycles" are counted by the clock signal of "200 MHz" normally operating the (3) 2101, the CPU (3) 2101 recognizes that the time-out error occurs.

The following describes how the time-out error is prevented by controlling the power supply in consideration of the boosting time of the power supplies of the data processing modules in the present exemplary embodiment under the above conditions.

If the time elapsing until the occurrence of the time-out error is recognized after "1" is input from the controller-unit control signal 1209 is delayed by 45 μsec, 30 μsec, in which 15 μsec consumed in the counter (2) 2201 is subtracted from 45 μsec, is created by counting by the counter (3) 2204.

Therefore, the count value of the counter (3) 2204 is set at 6000 cycles for a clock signal of 200 MHz, one cycle of which is 5 nsec, and a time period of 30 μsec is set to be an interrupt processing time.

Thus, the count value set to the counter (3) 2204 is made equal to the count value corresponding to a difference time between the time required until the data processing module which is powered on completes boosting and the time-out time of the CPU (3) 2101.

In the third exemplary embodiment, the amount of delay of the time used for determining the time-out error is set by the counter (3) 2204 in the CPU (3) 2101, so that the time for which the controller-unit control signal 1209 is "1" does not need to be controlled in particular.

As described above, the power supply control unit 1206 determines which data processing module is to be powered on based on information about the accessed address bus, controls the power supply control signal, and generates the controller-unit control signal 1209.

The CPU (3) 2101 interrupts the normal processing (for counting the time-out) in response to the controller-unit control signal 1209 and executes the interrupt processing according to the time corresponding to boosting of the data processing module. This means that the time required for recognizing the time-out error is later than the time required for boosting the data processing module.

As described above, in the third exemplary embodiment, the interrupt processing is used to delay the CPU recognizing the time-out error. Such a configuration can delay the CPU recognizing the time-out error with respect to the control and boost of the power supply in the data processing unit 1202 without the need for the normal modification of the CPU.

As described above, the CPU is capable of simply controlling the power supply using software based on the ACPI standards without regard for the state where the data processing module in the data processing unit 1202 is powered on or boosted while being powered on and preventing an access error from occurring when the data processing module is powered off or boosted.

The above exemplary embodiments describe the configuration in which the present invention is applied to a control unit of an MFP. However, the present invention can be applied not only to the MFP, but also to an information processing apparatus of various types of electronic apparatuses.

The configurations and contents of the above-described various data are not limited to those. It is to be understood that the data may be configured by various configurations and contents according to their applications and purposes. The present invention may include an exemplary embodiment as a system, apparatus, method, program, or recording medium, for example. In other words, the present invention is applicable to a system composed of a plurality of apparatuses or an apparatus composed of one device. The configuration in which the above exemplary embodiments are combined with one another is also included in the present invention.

The present invention can also be realized by executing the following processing. The processing is executed such that software for realizing the functions of the above exemplary embodiments is supplied to a system or apparatus via a network or various types of storage media and a computer (or a CPU or a micro-processing unit (MPU)) of the system or apparatus reads and executes the program.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-107821 filed May 13, 2011, which is hereby incorporated by reference herein in its entirety.

What is claimed is:

1. An information processing apparatus comprising:
   a processing unit;
   a power supply control unit configured to control power supply to the processing unit; and
   a controller unit configured to access the processing unit irrespective of a power supply state of the processing unit,
   wherein the power supply control unit is configured to power off the processing unit that is not in use,
   wherein the power supply control unit is configured to, in a case where the controller unit accesses the processing unit that is powered off, power on the processing unit and output a predetermined control signal to the controller unit, and
   wherein the controller unit is configured to recognize that an error occurs if the controller unit does not receive a response from the accessed processing unit before a first time-out time elapses in a case where the predetermined control signal is not received, and to recognize that the error occurs if the controller unit does not receive the response from the accessed processing unit before a second time-out time longer than the first time-out time elapses in a case where the predetermined control signal is received.

2. The information processing apparatus according to claim 1, wherein the controller unit includes a central processing unit and a clock supply unit configured to supply a clock signal to the central processing unit, and
   wherein the clock supply unit is configured to supply a clock signal having a first frequency to the central processing unit when the predetermined control signal is not received, and to, when the predetermined control signal is received, supply a clock signal having a second frequency lower than the first frequency to the central processing unit, or stop supplying a clock signal to the central processing unit.

3. The information processing apparatus according to claim 1, wherein the controller unit includes a central processing unit and a clock supply unit configured to supply a clock signal to the central processing unit, and
   wherein the clock supply unit is configured to supply a clock signal to the central processing unit when the predetermined control signal is not received, and to supply another clock signal obtained by dividing a frequency of the clock signal to the central processing unit when the predetermined control signal is received.

4. The information processing apparatus according to claim 2, wherein the power supply control unit is configured to output the predetermined control signal for a predetermined time period after powering on the processing unit.

5. The information processing apparatus according to claim 1, wherein the controller unit is configured to recognize the predetermined control signal as hardware interrupt, and to perform interrupt processing when the predetermined control signal is received.

6. The information processing apparatus according to claim 5, wherein the interrupt processing includes processing that requires a predetermined time to execute.

7. The information processing apparatus according to claim 6, wherein the interrupt processing includes processing that counts the predetermined time.

8. The information processing apparatus according to claim 4, wherein the predetermined time is at least a difference time between a time required until the the powered-on processing unit is completely boosted and the first time-out time.

9. The information processing apparatus according to claim 1, wherein the controller unit and the power supply control unit are powered on or off according to power control of software, and
wherein the processing unit is powered on or off according to hardware control of the power supply control unit without following the power control of software.

10. The information processing apparatus according to claim 9, wherein the power control of software includes power control based on Advanced Configuration and Power Interface (ACPI).

11. A method for controlling an information processing apparatus including a processing unit, a power supply control unit configured to control power supply to the processing unit, and a controller unit configured to access the one or the processing unit irrespective of a power supply state of the processing unit, the method comprising:

via the power supply control unit, powering off the processing unit that is not in use;
via the power supply control unit, in a case where the controller unit accesses the processing unit that is powered off, powering on the processing unit and outputting a predetermined control signal to the controller unit;
via the controller unit, recognizing that an error occurs if the controller unit does not receive a response from the accessed processing unit before a first time-out time elapses in a case where the predetermined control signal is not received; and
via the controller unit, recognizing that the error occurs if the controller unit does not receive the response from the accessed processing unit before a second time-out longer than the first time-out time elapses in a case where the predetermined control signal is received.

12. A non-transitory computer-readable storage medium storing computer-executable instructions to cause a computer to execute the method according to claim 11.

13. The information processing apparatus according to claim 1, the processing unit generates image data for executing printing.

* * * * *